US012630280B1

(12) United States Patent
George et al.

(10) Patent No.: US 12,630,280 B1
(45) Date of Patent: May 19, 2026

(54) SYSTEMS AND METHODS FOR PREDICTING AND MITIGATING MAGNETIC AND LOCATION SENSOR ERRORS USING A VISION SYSTEM ON A MARINE VESSEL

(71) Applicant: Brunswick Corporation, Mettawa, IL (US)

(72) Inventors: Trevor George, Savoy, IL (US); Brandon L. Tate, Walnut Hill, IL (US); Phillip M. Renkert, Urbana, IL (US)

(73) Assignee: Brunswick Corporation, Mettawa, IL (US)

( * ) Notice: Subject to any disclaimer, the term of this patent is extended or adjusted under 35 U.S.C. 154(b) by 77 days.

(21) Appl. No.: 18/595,981

(22) Filed: Mar. 5, 2024

(51) Int. Cl.
| | |
|---|---|
| *B63H 25/00* | (2006.01) |
| *B63H 25/04* | (2006.01) |
| *G01C 21/16* | (2006.01) |
| *G06T 7/593* | (2017.01) |

(52) U.S. Cl.
CPC ......... *B63H 25/04* (2013.01); *G01C 21/1656* (2020.08); *G06T 7/593* (2017.01); *B63H 2025/045* (2013.01)

(58) Field of Classification Search
CPC ........ B63H 25/00; B63H 25/02; B63H 25/04; B63H 2025/045; G01C 21/00; G01C 21/165; G01C 21/12; G01C 21/1656; G06T 7/593
USPC ............................................. 701/21; 318/588
See application file for complete search history.

(56) References Cited

U.S. PATENT DOCUMENTS

| | | | | |
|---|---|---|---|---|
| 6,028,608 | A * | 2/2000 | Jenkins | ................... G06T 15/00 |
| | | | | 345/619 |
| 6,459,990 | B1 * | 10/2002 | McCall | ............. G01C 21/1654 |
| | | | | 73/178 R |
| 8,050,630 | B1 | 11/2011 | Arbuckle | |
| 8,417,399 | B2 | 4/2013 | Arbuckle et al. | |

(Continued)

OTHER PUBLICATIONS

Enrique David Marti, David Martin, Jesus Garcia, Arturo De La Escalera, Jose Manuel Molina and Jose Maria Armingol, Context-aided sensor fusion for enhanced urban navigation, journal, Dec. 6, 2012, Basel Switzerland.

(Continued)

*Primary Examiner* — Jonathan L Sample
(74) *Attorney, Agent, or Firm* — Andrus Intellectual Property Law, LLP

(57) ABSTRACT

A system for mitigating navigation sensor errors using a vision system on a marine vessel is provided, the system comprising: a navigation sensor; a camera configured to be mounted to the marine vessel with an associated field of view of an environment; and a processor configured to: identify, based on image data from the camera, an object in the environment that is predicted to impact reliability of a signal from the navigation sensor of the marine vessel, wherein the object is associated with a location in the environment of the marine vessel; determine that the object is in a position to interfere with the navigation sensor based on the location associated with the object; and determine a navigation parameter of the marine vessel with a reduced reliance on signals from the navigation sensor based on the determination that the object is in a position to interfere.

20 Claims, 11 Drawing Sheets

(56) References Cited

U.S. PATENT DOCUMENTS

| | | | | |
|---|---|---|---|---|
| 8,694,248 | B1 * | 4/2014 | Arbuckle | G01C 21/28 702/69 |
| 9,377,780 | B1 * | 6/2016 | Arbuckle | G01C 21/20 |
| 10,259,555 | B2 * | 4/2019 | Ward | B63H 21/213 |
| 10,322,787 | B2 | 6/2019 | Ward | |
| 10,429,845 | B2 | 10/2019 | Arbuckle et al. | |
| 10,907,971 | B2 * | 2/2021 | Roumeliotis | G06T 7/74 |
| 10,926,855 | B2 | 2/2021 | Derginer et al. | |
| 10,962,625 | B2 * | 3/2021 | Aycock | G01S 19/485 |
| 11,145,076 | B1 * | 10/2021 | Horesh | G06T 7/74 |
| 11,940,277 | B2 * | 3/2024 | Roumeliotis | G07C 5/08 |
| 2007/0213933 | A1 * | 9/2007 | Zeng | G01C 21/165 701/510 |
| 2017/0336806 | A1 * | 11/2017 | Blanc-Paques | G08G 5/57 |
| 2019/0331762 | A1 * | 10/2019 | Aycock | G06T 7/70 |
| 2019/0361446 | A1 * | 11/2019 | Ward | B63H 25/42 |
| 2020/0140051 | A1 * | 5/2020 | Derginer | G05D 1/0875 |
| 2020/0264676 | A1 * | 8/2020 | Gauthier, Jr. | H04N 23/80 |
| 2020/0309541 | A1 * | 10/2020 | Lavy | G06V 20/588 |
| 2020/0331499 | A1 * | 10/2020 | Watanabe | G01C 21/3407 |
| 2021/0033400 | A1 * | 2/2021 | Belenkii | G02B 23/04 |
| 2021/0088667 | A1 * | 3/2021 | Heling | G01S 17/89 |
| 2021/0364632 | A1 * | 11/2021 | Sagalovich | G06V 20/58 |
| 2022/0144403 | A1 * | 5/2022 | Derginer | B63B 49/00 |
| 2022/0413160 | A1 * | 12/2022 | Fortney | G01S 19/485 |
| 2024/0230341 | A1 * | 7/2024 | Belenkii | G01C 21/025 |
| 2025/0067880 | A1 * | 2/2025 | Benfold | G01S 19/396 |

OTHER PUBLICATIONS

Arnav Vaibhav Malawade, Trier Mortlock, Mohammad Abdullah Al Faruque, Hydrafusion: Context-Aware Selective Sensor Fusion for Robust and Efficient Autonomous Vehicle Perception, https://github.com/AICPS/hydrafusion, Jan. 1, 20227, Irvine California.

Yu Gu, Jason N. Gross, Matthew B. Rhudy, Kyle Lassak, A Fault-Tolerant Multiple Sensor Fusion Approach Applied to UAV Attitude Estimation, vol. 2016, Article ID 6217428, Published Feb. 24, 2016.

Mohammed Alharbi, Hassan A. Karimi, Context-Aware Sensor Uncertainty Estimation for Autonomous Vehicles, Vehicles 2021, 3, 721-735, Published Oct. 25, 2021, Basel Switzerland.

Yongjun Wang, Zhi Li, Ziang Li, External Disturbances Rejection for Vector Field Sensors in Attitude and Heading Reference Systems, Published Aug. 25, 2020, Basel Switzerland.

Jehong Lee, Joenggeun Lim, Jongho Lee, Compensated Heading Angles for Outdoor Mobile Robots in Magnetically Disturbed Environment, in IEEE Transactions on industrial Electronics, vol. 65, No. 2, pp. 1408-1419, Published Jul. 17, 2017.

Bingfei Fan, Qinggou Li, Tao Liu, How Magnetic Disturbance Influences the Attitude and Heading in Magnetic and Inertial Sensor-Based Orientation Estimation, Published Dec. 28, 2017, Basel Switzerland.

Snyder et al. "Systems and Methods for Detection of and Response To Erroneous Magnetometer Measurements in a Marine Propulsion Control System" Unpublished Provisional U.S. Appl. No. 63/497,598, filed Apr. 21, 2023.

* cited by examiner

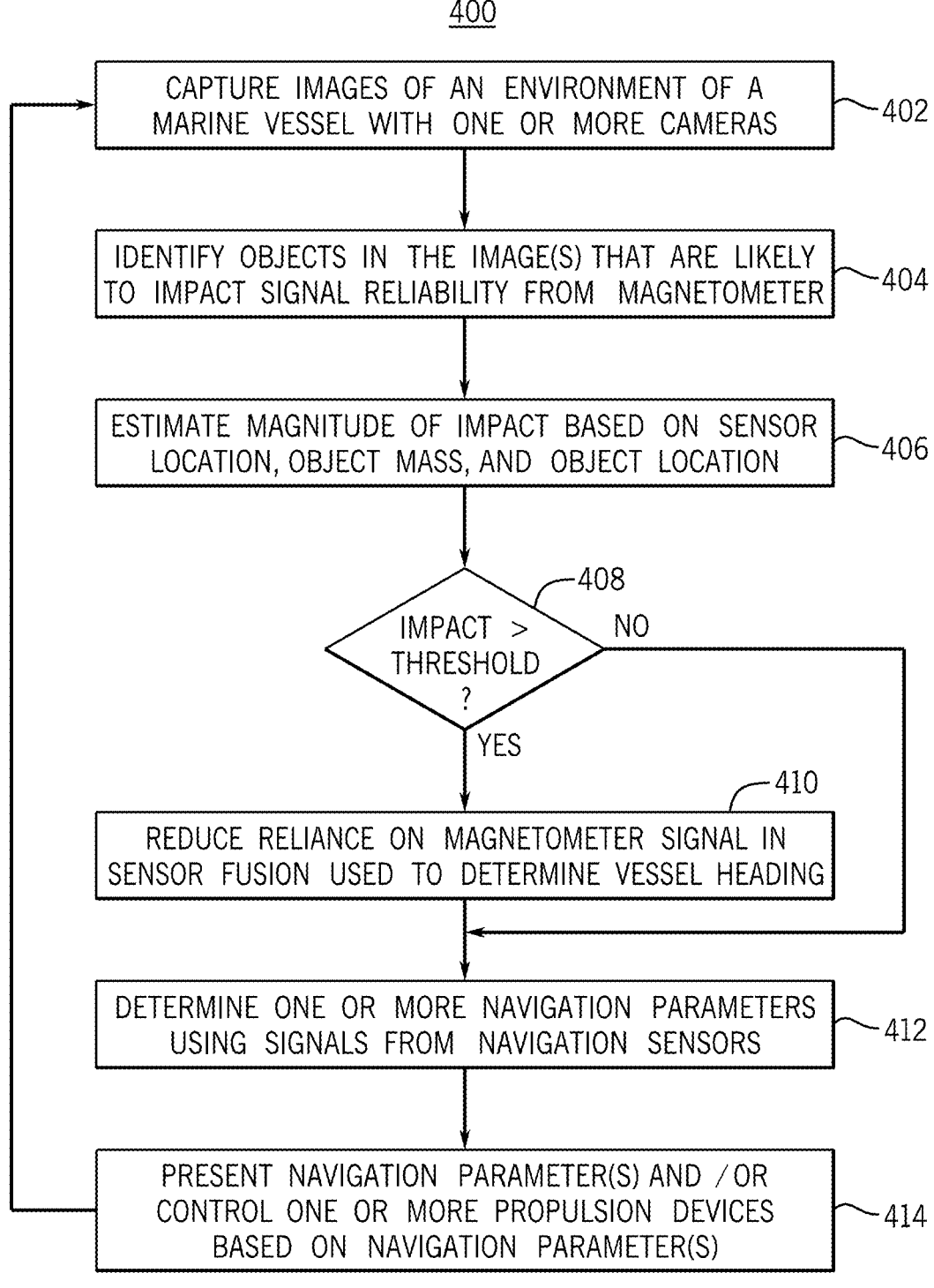

400

CAPTURE IMAGES OF AN ENVIRONMENT OF A MARINE VESSEL WITH ONE OR MORE CAMERAS — 402

IDENTIFY OBJECTS IN THE IMAGE(S) THAT ARE LIKELY TO IMPACT SIGNAL RELIABILITY FROM MAGNETOMETER — 404

ESTIMATE MAGNITUDE OF IMPACT BASED ON SENSOR LOCATION, OBJECT MASS, AND OBJECT LOCATION — 406

IMPACT > THRESHOLD ? — 408

NO

YES

REDUCE RELIANCE ON MAGNETOMETER SIGNAL IN SENSOR FUSION USED TO DETERMINE VESSEL HEADING — 410

DETERMINE ONE OR MORE NAVIGATION PARAMETERS USING SIGNALS FROM NAVIGATION SENSORS — 412

PRESENT NAVIGATION PARAMETER(S) AND / OR CONTROL ONE OR MORE PROPULSION DEVICES BASED ON NAVIGATION PARAMETER(S) — 414

FIG. 4

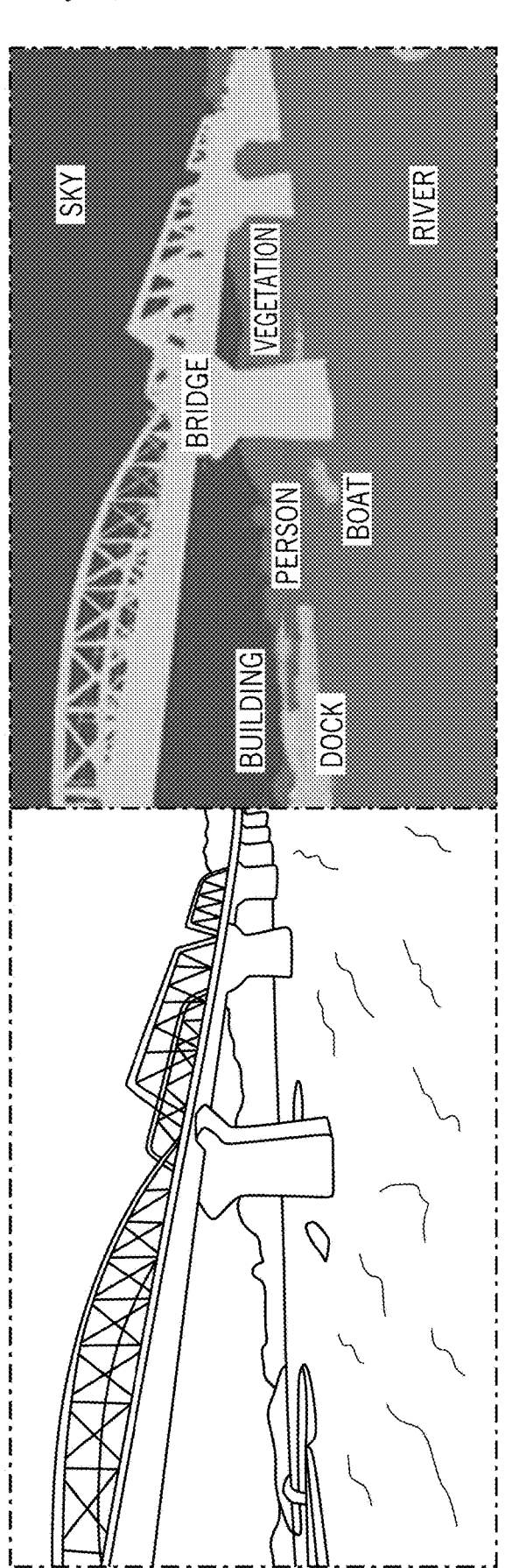
FIG. 10

SYSTEMS AND METHODS FOR PREDICTING AND MITIGATING MAGNETIC AND LOCATION SENSOR ERRORS USING A VISION SYSTEM ON A MARINE VESSEL

FIELD

The present disclosure generally relates to systems and methods for predicting magnetic and location sensor errors using a vision system on a marine vessel, and mitigating a contribution of such errors to location and pose of the marine vessel.

BACKGROUND

The following U.S. Patents are incorporated herein by reference, in entirety:

U.S. Pat. No. 8,050,630 discloses a method for monitoring the operation of a global positioning system receiver, in accordance with a some embodiments, comprising determining a magnitude of a difference between two occurrences of a first signal, comparing the magnitude of the difference to a preselected threshold value, and identifying an operating condition of the receiver as a function of the relative magnitudes of the difference between the two occurrences and the selected threshold value. The first signal can include a plurality of serial occurrences and the comparing can include subtracting one of the two occurrences from another of the two occurrences to calculate the difference between the two occurrences.

U.S. Pat. No. 8,417,399 discloses a system for orienting a marine vessel comprising a plurality of marine propulsion devices for orienting a marine vessel; and a control device having a memory and a programmable circuit. The control device is programmed to control operation of the plurality of marine propulsion devices to maintain orientation of a marine vessel in a selected global position. In addition, the control device receives at least one of actual pitch and actual roll of the marine vessel in the global position and is programmed to control operation of the plurality of marine propulsion units to change the heading of the marine vessel to minimize at least one of the actual pitch and the actual roll while maintaining the marine vessel in the selected global position.

U.S. Pat. No. 9,377,780 discloses a system for determining a heading value of a marine vessel that includes a compass that determines a compass heading of the marine vessel, and a global positioning system receiver that calculates a course over ground of the marine vessel. A control circuit scales each of the compass heading and the course over ground and adds the scaled compass heading and course over ground together so as to determine the heading value.

U.S. Pat. No. 10,259,555 discloses a method that controls movement of a marine vessel near an object, the marine vessel being propelled by thrust generated by a marine propulsion system according to commands from a controller. The method comprises accepting, with the controller, a signal representing a desired movement of the marine vessel from a desired movement operational section. The controller resolves the desired movement of the marine vessel into a target linear thrust and a target moment about a preselected point on the marine vessel and determines a magnitude and a direction of a thrust vector of the marine propulsion system that will result in achievement of the target linear thrust and the target moment about the preselected point on the marine vessel. A sensor senses a shortest distance between the object and the marine vessel and a direction of the object with respect to the marine vessel. The controller compares the shortest distance between the object and the marine vessel to a predetermined range. In response to the marine vessel being within the predetermined range of the object, the controller automatically nullifies any vector components of the thrust vector that would otherwise cause net thrust in the direction of the object U.S. Pat. No. 10,322,787 discloses a system for maintaining a marine vessel in a body of water at a selected position and a selected orientation is disclosed. A global positioning system (GPS) on the marine vessel determines a global position and a heading of the marine vessel with respect to Earth's geographic coordinate system. A proximity sensor on the marine vessel determines a relative position and a bearing of the marine vessel with respect to an object near the marine vessel. A controller is operable in a station keeping mode and is in signal communication with the GPS and the proximity sensor. The controller chooses between using global position and heading data from the GPS and relative position and bearing data from the proximity sensor to determine if the marine vessel has moved from one or both of the selected position and the selected orientation. In the station-keeping mode, the controller thereafter calculates thrust commands required to return the marine vessel to the selected position and the selected orientation and outputs the thrust commands to a marine propulsion system, which uses the thrust commands to reposition the marine vessel at the selected position and the selected orientation.

U.S. Pat. No. 10,429,845 discloses a system that controls a position of a marine vessel near an object, the marine vessel being movable with respect to first, second, and third axes that are perpendicular to one another and define six degrees of freedom of potential vessel movement. The system includes a location sensor that measures a present location of the marine vessel and a heading sensor that determines a present heading of the marine vessel. A control module is in signal communication with the location sensor and the heading sensor. A marine propulsion system is in signal communication with the control module. The control module determines marine vessel movements that are required to translate the marine vessel from the present location to the target location and to rotate the marine vessel from the present heading to the target heading. The control module controls the propulsion system to produce components of the required marine vessel movements no more than two degrees of freedom at a time during a given iteration of control.

U.S. Pat. No. 10,926,855 discloses a method for controlling low-speed propulsion of a marine vessel powered by a marine propulsion system having a plurality of propulsion devices includes receiving a signal indicating a position of a manually operable input device movable to indicate desired vessel movement within three degrees of freedom, and associating the position of the manually operable input device with a desired inertial velocity of the marine vessel. A steering position command and an engine command are then determined for each of the plurality of propulsion devices based on the desired inertial velocity and the propulsion system is controlled accordingly. An actual velocity of the marine vessel is measured and a difference between the desired inertial velocity and the actual velocity is determined, where the difference is used as feedback in subsequent steering position command and engine command determinations.

SUMMARY

In accordance with some embodiments of the disclosed subject matter, a system for mitigating navigation sensor errors using a vision system on a marine vessel is provided, the system comprising: a navigation sensor; a camera, wherein the camera is configured to be mounted to the marine vessel with an associated field of view of an environment of the marine vessel; and one or more hardware processors configured to: identify, based on image data from the camera, an object in the environment that is predicted to impact reliability of a signal from the navigation sensor of the marine vessel, wherein the object is associated with a location in the environment of the marine vessel; determine that the object is in a position to interfere with the navigation sensor based on the location associated with the object; and determine a navigation parameter of the marine vessel with a reduced reliance on signals from the navigation sensor based on the determination that the object is in a position to interfere.

In some embodiments, the camera is a stereoscopic camera.

In some embodiments, the navigation parameter is one of a plurality of navigation parameters determined by the one or more hardware processors, the plurality of navigation parameters comprising: a heading of the marine vessel; a speed of the marine vessel; a course, and a course over ground of the marine vessel.

In some embodiments, the navigation sensor comprises a magnetometer, and wherein the navigation parameter is a heading of the marine vessel.

In some embodiments, the one or more hardware processors are further configured to: determine an estimated size of the object; and determine an estimated impact of the object on signals from the magnetometer based on the size of the object and a distance to the object.

In some embodiments, the one or more hardware processors are further configured to: determine three-dimensional location information associated with the object in a three-dimensional global coordinate system based the image data, wherein the three-dimensional location information comprises point cloud points; determine an estimated shape of the object, including a portion of the object that is outside of the field of view of the camera, based on the point cloud points; and determine the estimated size of the object based on the estimated shape of the object.

In some embodiments, the one or more hardware processors are further configured to: determine an estimated mass of iron included in the object based on the size of the object; determine an estimated location of a centroid of the object based on the estimated shape of the object; and determine the estimated impact based on the estimated mass of iron and the inverse square of a distance between the estimated location of the centroid and a location of the magnetometer.

In some embodiments, the one or more hardware processors are further configured to: determine whether the estimated impact exceeds a predetermined threshold; and cause reliance on the signals from the navigation sensor to be reduced in response to determining that the estimated impact exceeds the predetermined threshold.

In some embodiments, the navigation sensor comprises a satellite navigation receiver, and wherein the navigation parameter is a course over ground of the marine vessel.

In some embodiments, the one or more hardware processors are further configured to: receive segmentation information associated with the camera, wherein the segmentation information includes classification information associated with features located in the field of view associated with the camera; and identify the object based on the segmentation information.

In some embodiments, the navigation sensor comprises a magnetometer, and wherein the one or more hardware processors are further configured to: receive the image data from the camera; provide the image data to a trained machine learning model, wherein the trained machine learning model was trained to identify objects that include ferromagnetic material that interferes with the magnetometer; and receive, from the trained machine learning model, output indicative of a likelihood that the object includes ferromagnetic material that interferes with the magnetometer; and determine, based at least in part on the output received from the trained machine learning model, that the object is predicted to impact reliability of the signal from the magnetometer.

In some embodiments, the one or more hardware processors are further configured to: receive, from a data structure, information identifying one or more disturbance objects in the environment within a predetermined distance of the marine vessel, wherein the one or more disturbance objects are objects that impact reliability of a signal from at least one type of navigation sensor, the navigation sensor of the marine vessel corresponding to the at least one type, and wherein each of the one or more disturbance objects is associated with a location; determine that the object does not correspond to any of the one or more disturbance objects based on the location associated with the object; and in response to determining that the object does not correspond to any of the one or more disturbance objects, add the object to the data structure as a disturbance object.

In some embodiments, the one or more hardware processors are further configured to: adjust a covariance associated with signals from the navigation sensor based on the determination that the object is in a position to interfere; and determine, using a Kalman filter, the navigation parameter of the marine vessel using the adjusted covariance.

In accordance with some embodiments of the disclosed subject matter, a system for mitigating navigation sensor errors on a marine vessel is provided, the system comprising: a navigation sensor; and one or more hardware processors configured to: determine a current location of the marine vessel; query a data structure based on the current location of the marine vessel, wherein the data structure includes information indicative of whether a particular location is associated with a navigation sensor disturbance; receive a response to the query, wherein the response includes information indicating that a reliability of a signal from the navigation sensor is likely to be impacted based on the current location of the marine vessel; and determine a navigation parameter of the marine vessel with a reduced reliance on signals from the navigation sensor based on the information indicating that a reliability of a signal from the navigation sensor is likely to be impacted based on the current location of the marine vessel.

In some embodiments, the data structure comprises a database that includes a plurality of disturbance objects, each disturbance object is associated with location information.

In some embodiments, each disturbance object is associated information indicative of at least one type of navigation sensor that the disturbance object impacts.

In some embodiments, the data structure comprises a map database that includes a magnetic disturbance value associated with each or a plurality of locations.

In some embodiments, the system further comprises a camera, wherein the camera is configured to be mounted to the marine vessel with an associated field of view of an environment of the marine vessel; and wherein the one or more hardware processors are further configured to: identify, based on image data from the camera, an object in the environment that is predicted to impact reliability of a signal from the navigation sensor of the marine vessel, wherein the object is associated with a location in the environment of the marine vessel; receive, from the data structure, information identifying one or more disturbance objects in the environment within a predetermined distance of the marine vessel, wherein the one or more disturbance objects are objects that impact reliability of a signal from the navigation sensor, and wherein each of the one or more disturbance objects is associated with a location; and determine whether the object corresponds to one of the disturbance objects based on the location associated with the object.

In some embodiments, the one or more hardware processors are further configured to: determine that the object corresponds to one of the disturbance objects based on the location associated with the object; and in response to determining that the object corresponds to one of the disturbance objects, reduce reliance on signals from the navigation sensor by an amount based on a disturbance value associated with that disturbance object.

In some embodiments, the one or more hardware processors are further configured to: determine that the object does not correspond to any of the disturbance objects based on the location associated with the object; determine that the object is a permanent structure; and add the object to the data structure as a disturbance object.

BRIEF DESCRIPTION OF THE DRAWINGS

The present disclosure is described with reference to the following drawings.

FIG. 4 shows an example of a process for predicting and mitigating magnetic sensor errors using a vision system of a marine vessel in accordance with some embodiments of the disclosure.

FIG. 10 shows an example of an image and segmentation information generated based on the image, which can be used in predicting and mitigating sensor errors using a vision system of a marine vessel in accordance with some embodiments of the disclosure.

DETAILED DESCRIPTION

Figure 1:
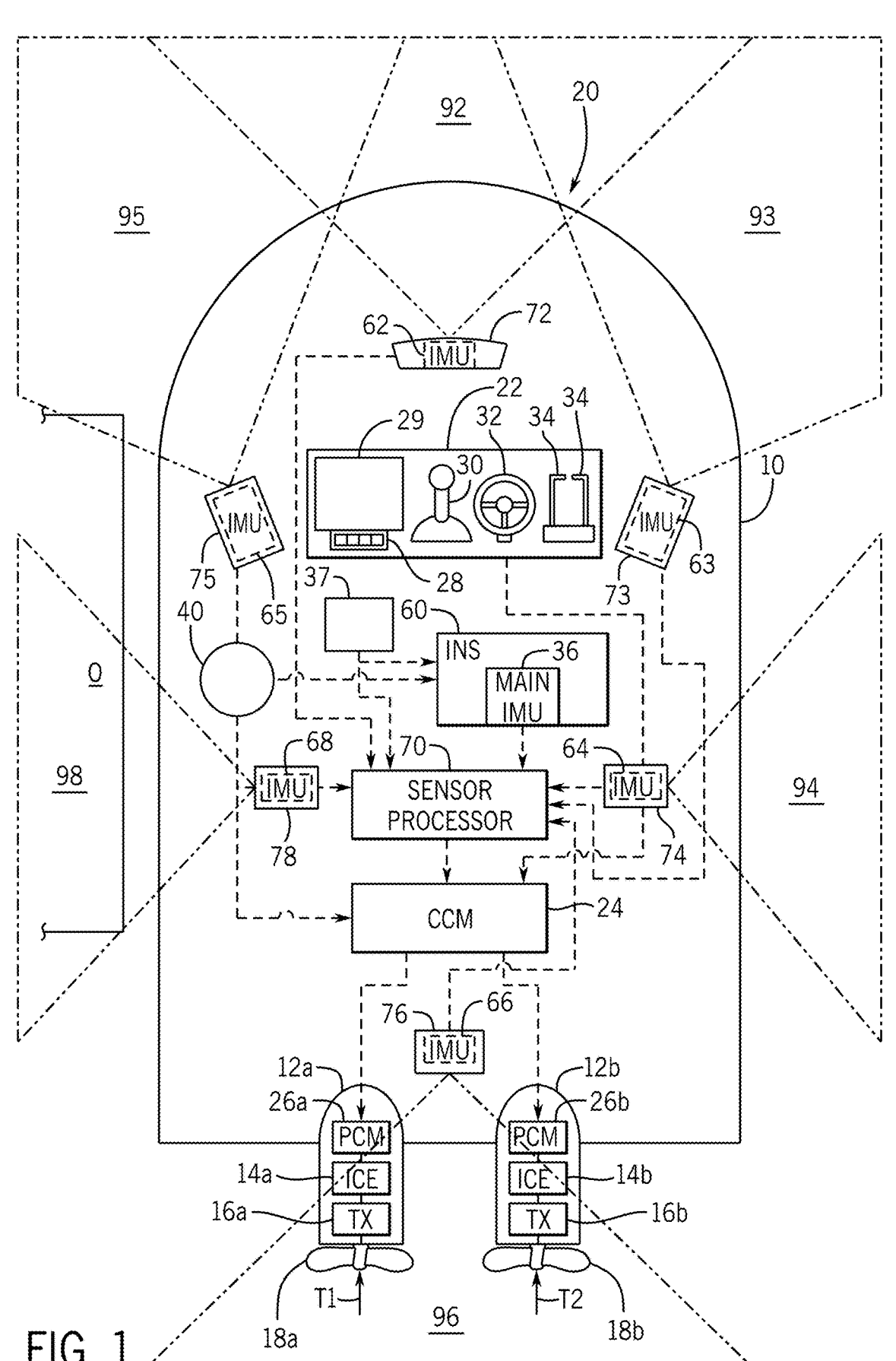
FIG. 1 shows an example of a propulsion system on a marine vessel in accordance with some embodiments of the disclosure.

Some marine vessels are configured to facilitate advanced controls and/or autonomous controls that can utilize sensor feedback to carry out a maneuver. For example, some marine vessels include a joystick system that facilitates lateral movement and/or rotational movement (e.g., without forward or backward movement). In some joystick systems magnetometer data can be used to estimate a current heading, and a closed-loop control algorithm can use the heading to confirm whether the commanded thrust provided by a propulsion device(s) is resulting in a movement commanded by the joystick (e.g., lateral movement). For example, current and/or wind can cause a marine vessel to rotate or move off axis, so just maintaining an angle of the thrust may not be sufficient to control a heading accurately. A metal object (such as a dock that includes iron components) can cause interference in the magnetic field near the metal object, which can cause a heading from the magnetometer to become inaccurate, resulting in an incorrect heading estimate. For example, magnetically permeable material can cause errors in magnetometer readings when the material is close to the magnetometer. Approaches have been proposed to eliminate magnetometer disturbances, which generally use magnetometer data itself to determine when the magnetometer data has become unreliable. For example, if a change in a magnitude or angle of the magnetic field exceeds a threshold, the magnetometer data can be excluded from a calculation of heading. As another example, an internal model of a disturbance can be used to estimate the disturbance based on the magnetometer data, and can be used to correct the heading estimate.

In some embodiments, mechanisms described herein can identify sources of sensor disturbances (e.g., magnetometer sensor disturbances, location sensor disturbances) using a vision system of the marine vessel and/or from a data structure (e.g., a database, a map, a chart, etc.), providing a source of information that can be used to predict a disturbance, and facilitate a proactive response (e.g., reducing a reliance on an unreliable sensor).

In some embodiments, mechanisms described herein can predict that magnetometer data is likely to be inaccurate when in a vicinity of a metal object using contextual information from a vision system of the marine vessel. In some embodiments, mechanisms described herein can adjust how different sources of data are used to estimate a heading to mitigate an impact of inaccurate magnetometer data on the heading estimate. Additionally, in some embodiments, described herein can predict that satellite navigation data (e.g., global positioning system (GPS) data) is likely to be inaccurate when the marine vessel is passing underneath a bridge or other object. For example, in some embodiments, mechanisms described herein can utilize contextual-information from cameras of a vision system to predict disturbances in the magnetic field or satellite navigation location. That information can then be used to exclude unreliable data from an estimate of a navigation parameter (e.g., a heading, location, course, course over ground, etc.) or reduce the effect of the data on the estimate if a disturbance is present, relying more on other sources of data (e.g., visual odometry, a COG-based heading, IMU data, etc.).

Additionally, in some embodiments, objects known to disturb magnetometer data and/or satellite navigation data can be added to a map or other data structure, which can be referenced by other vessels (e.g., vessels that are not configured with a vision system). In some embodiments, a disturbance map (or database, etc.) can be generated and/or update, and disturbances (e.g., disturbance objects and/or information indicative of a magnitude and/or direction of a disturbance at a particular location) can be added to the map (or other data structure) as vessels identify objects likely to cause a disturbance, and/or during collection of data used to generate navigational charts and/or other navigational information.

FIG. 1 shows an example of a schematic representation of a propulsion system on a marine vessel in accordance with some embodiments of the disclosed subject matter. FIG. 1 shows a marine vessel 10 equipped with a propulsion system 20 on marine vessel 10 configured in accordance with some embodiments of the disclosed subject matter. In some embodiments, propulsion system 20 can be configured to operate, for example, in a joysticking mode in which a joystick is operated by a user to control vessel movement within an x/y plane, among other modes (e.g., as described hereinbelow). In some embodiments, propulsion system 20 can include first and second propulsion devices 12a, 12b that produce first and second thrusts T1, T2 to propel the vessel 10. First and second propulsion devices 12a, 12b are illustrated as outboard motors, but can alternatively be inboard motors, stern drives, jet drives, pod drives, any other suitable propulsion device, or combinations thereof. Each propulsion device can be provided with an engine 14a, 14b operatively connected to a transmission 16a, 16b, in turn, operatively connected to a propeller 18a, 18b.

In some embodiments, vessel 10 can also house various control elements that comprise part of the marine propulsion system 20. For example, marine propulsion system 20 can comprise an operation console 22 in signal communication, for example via a controller area network (CAN) bus, with a controller 24, such as for example a command control module (CCM), and with propulsion control modules (PCM) 26a, 26b associated with the respective propulsion devices 12a, 12b. Each of controller 24 and PCMs 26a, 26b can include memory and a programmable processor. Each control module 24, 26a, 26b can include one or more processors communicatively connected to a respective storage system comprising a computer-readable medium that includes volatile and/or nonvolatile memory upon which computer-readable code and data can be stored. Additionally or alternatively, in some embodiments, a processor(s) of one or more of control modules 24, 26a, 26b can be communicatively connected to a shared storage system comprising a computer-readable medium that includes volatile and/or nonvolatile memory upon which computer-readable code and data can be stored.

Note that although mechanisms described herein are generally described in connection with an internal combustion engine (ICE) propulsion system that includes a powerhead implemented using an ICE engine, mechanisms described herein can be used in connection with a propulsion system that includes any other suitable powerhead, such as one or more electric motors, or any suitable combination of powerheads. For example, propulsion devices 12a, 12b can be replaced by, or used in combination with, one or more propulsion devices that produce thrust to propel vessel 10 using an electric motor, such as an electric outboard motor, electric inboard motor, electric stern drive, electric jet drive, electric pod drive, any other suitable propulsion device, or combinations thereof, that is implemented using an electric motor (e.g., including a motor that is directly connected to a propulsor shaft without a transmission, such as transmission 16a, 16b).

In some embodiments, operation console 22 can include any suitable number of user input devices, such as, a keypad 28, a joystick 30, a steering wheel 32, one or more throttle/shift levers 34, etc., and any suitable number of output devices, such as a display 29, a heads-up display (not shown), one or more speakers (not shown), etc. In some embodiments, each of the input devices can be configured to input commands to controller 24, which can, in turn, communicate control instructions to first and second propulsion devices 12a, 12b by communicating with PCMs 26a, 26b. In some embodiments, steering wheel 32 and throttle/shift lever(s) 34 can function in a conventional manner, such that rotation of steering wheel 32, for example, activates a transducer that provides a signal to controller 24 regarding a desired direction of the vessel 10. Controller 24 can, in turn, send signals to PCMs 26a, 26b (and/or thrust vector module(s) (TVMs), or additional modules if provided), which in turn can activate steering actuators to achieve desired orientations of the propulsion devices 12a, 12b. In some embodiments, propulsion devices 12a, 12b can be independently steerable about a respective steering axis. Throttle/shift lever(s) 34 can send signals to controller 24 regarding the desired gear (e.g., forward, reverse, or neutral) of transmissions 16a, 16b and desired rotational speed of engines 14a, 14b of propulsion devices 12a, 12b. Controller 24 can, in turn, send signals to PCMs 26a, 26b, which in turn activate electromechanical actuators in transmissions 16a, 16b and engines 14a, 14b for shift and throttle, respectively. A manually operable input device, such as joystick 30, can also be used to provide signals to controller 24. In some embodiments, joystick 30 can be used to allow an operator of vessel 10 to manually maneuver vessel 10, such as to achieve lateral translation or rotation of vessel 10.

In some embodiments, output devices, such as display 29, speakers, etc., can be configured to present (e.g., visually, audibly, etc.) any suitable data, information, image data (e.g., images captured by one or more devices that include an image sensor(s)), received from controller 24, from another controller and/or another processor, and/or generated based on data and/or information received from controller 24, another controller, and/or another processor. In some embodiments, display 29 can be any suitable display, such as a multi-function display (MFD). In some embodiments, display 29 can be used to present a user interface, which can be implemented as a touchscreen or display that is capable of receiving input via a touchscreen. In some embodiments, one or more other input devices can be used to interact with a user interface (e.g., a graphical user interface) presented by display 29, such as a keypad (e.g., keypad 28), a keyboard, a track ball, a track pad, any other suitable user input device, and/or suitable combination of user input devices. In some embodiments, vessel 10 can include multiple displays 29, which can be integrated into operation console 22, integrated into another portion of vessel 10, and/or mechanically mounted to operation console 22 or another portion of vessel 10. In some embodiments, display 29 can be used to present menus, operational data (e.g., throttle, speed, heading, engine output, etc.), maps, charts, settings that can be used to configure another display (e.g., a HUD, another MFD), etc.

In some embodiments, propulsion system 20 can also include one or more depth sensors 72, 73, 74, 75, 76, and 78. In some embodiments, depth sensors 72-78 can form a portion of a vision system associated with vessel 10 (although the vision system may be configured to use sensing modes other than visible light, such as sound-based sensing, radio-based sensing, infrared-based sensing, etc.). Although a limited number of depth sensors are shown (e.g., one perpendicular to each of the bow, stern, and port and starboard sides of vessel 10, and two positioned at an angle between the bow and sides), fewer or more sensors can be provided at each location and/or provided at other locations, such as on a hardtop of vessel 10. In some embodiments, depth sensors 72-78 can be used to determine a three-dimensional location of an object and/or other feature of an environment (e.g., a water surface) that is within a field of view (e.g., partial FOVs 92, 93, 94, 95, 96, and 98 shown in FIG. 1, associated with depth sensors 72, 73, 74, 75, 76, and 78 respectively) of the depth sensor with respect to the location of the depth sensor (e.g., distance to various points on an object and a direction associated with each of the various points). For example, depth sensors 72-78 can be implemented using one or more depth cameras (e.g., implemented using stereoscopic imaging techniques, structured light imaging techniques, continuous-wave time-of-flight imaging techniques, direct time-of-flight imaging techniques, etc.), three-dimensional laser range finders (e.g., implemented using light detection and ranging (lidar) techniques), radars, sonars, and/or other devices individually capable of determining both the distance and direction to points on an object and/or other feature relatively accurately (e.g., on the order of several to tens of centimeters (cm) at relatively close ranges on the order of several to tens of meters, such as an accuracy of about +/−3 cm at 5 meters (m) and +/−13 cm at 10 m for stereoscopic cameras), e.g., the relative position of various points on an object O (such as a dock, a seawall, a slip, another vessel, a person, a portion of a bridge, a portion of a dam, a relatively large rock, a tree, etc.) with respect to each sensor 72-78 having a field of view that includes object O. In some embodiments, a 3D location of object O and/or various points on object O with respect to vessel 10 can be determined (e.g., by a sensor processor 70) using the location of object O and/or various points on object O determined by one or more of depth sensors 72-78. Additionally, in some embodiments, a 3D location of points of vessel 10 that fall within a sensor FOV can be determined (e.g., by sensor processor 70) using the location of points on vessel 10 determined by one or more of depth sensors 72-78. In some embodiments, a calibration process can be performed to determine a set of transforms that can be used to convert a location from a local coordinate system used by a particular depth sensor (sometimes referred to herein as a camera coordinate system, although it can be a coordinate system used by another type of depth sensor, such as a lidar or sonar-based sensor) to the corresponding location in a global coordinate system used by vessel 10 (e.g., used to perform autonomous navigation processes, such as automatically guiding vessel 10 during docking, automatically guiding vessel 10 during trailer loading or unloading, automatically avoiding collisions with objects via a virtual buffer zone, autonomous navigation through areas that include other vessels and/or other obstacles, etc.). The camera coordinate system can define a local reference frame for a particular camera (or other type of depth sensor), and the global coordinate system can define a reference frame to which each camera (or other type of depth sensor) is calibrated, which can be referred to as a common reference frame, a global reference frame, or a world reference frame (note that the global coordinate system can be independent and distinct from the geographical coordinate system of latitude and longitude often used to designate locations on Earth).

In some embodiments, a camera coordinate system can be defined relative to a center of an imaging plane (e.g., with an origin at a center of the imaging plane, a depth axis extending perpendicular to the imaging plane, and lateral axes extending perpendicular to the depth axis) of the camera. In some embodiments, the camera coordinate system can use any suitable type of coordinate system, such as a 3D Cartesian coordinate system, a spherical coordinate system, a cylindrical coordinate system, etc. Note that the type of coordinate system used to define the camera coordinate system can vary based on the type of sensor being used. For example, depth cameras can use a Cartesian coordinate system that defines a depth axis (e.g., a z-axis) that extends perpendicular to the imaging plane of the camera (e.g., an imaging plane associated with an image sensor of the camera), and lateral coordinates (e.g., an x-axis and a y-axis) that extend parallel to the imaging plane and can be used to define the horizontal and vertical distance of a point from an optical axis of the camera. As another example, a scanning lidar that sweeps across a scene using a laser line or single laser point can use a cylindrical coordinate system that defines a depth axis (e.g., an r-axis) that extends perpendicular to the light detector(s) (e.g., an imaging plane associated with an area sensor, an imaging axis of a line sensor), and lateral coordinates (e.g., a z-axis and a e coordinate) that can be used to define the angular distance (e.g., in degrees or radians) and vertical distance of a point from reference axes of the lidar system.

In some embodiments, a global coordinate system (sometimes referred to as global coordinates or world coordinates) can be defined relative to a particular point on vessel 10. For example, a coordinate system of a particular depth sensor can be used as the basis for the global coordinate system (e.g., a front-facing camera, such as depth sensor 72), and locations of points in an environment of vessel 10 can be defined based on the distance from an origin of that camera coordinate system. In such an example, an offset can be used to determine a location of a particular point on the vessel (e.g., a point of navigation, such as center of gravity (COG) or center of rotation (COR) of vessel 10). As another example, locations of points in an environment of vessel 10 can be defined based on the distance from a COG or COR of vessel 10. In some embodiments, the global coordinate system can use any suitable type of coordinate system, such as a 3D Cartesian coordinate system, a spherical coordinate system, a cylindrical coordinate system, etc.

In some embodiments, sensors 72-78 can determine and/or provide information regarding a location of an object in camera coordinates and using any suitable format (e.g., providing information using a depth image(s) such as an RGBD image, or using a point cloud in any suitable file format). Additionally or alternatively, in some embodiments, sensors 72-78 can determine and/or provide information regarding a location of an object in global coordinates (e.g., using a transform between camera coordinates and global coordinates identified during a calibration procedure) and using any suitable format (e.g., providing information using a depth image(s) such as an RGBD image, or using a point cloud in any suitable file format). In some embodiments, sensors 72-78 can provide position information for various points within that sensor's FOV to one or more controllers, such as to sensor processor 70 and/or controller 24 via any suitable communication network, such as by way of a dedicated bus connecting the sensors to a controller, a CAN bus, or wireless network link(s), as described below. In some embodiments, given the large amount of proximity data produced by depth sensors 72-78, the connection between sensors 72-78 and sensor processor 70 (and/or any other suitable processor) can be via a dedicated bus or network connection. Such a dedicated bus or network connection can be separate from the vessel network (e.g., including a CAN bus) in order to facilitate transmission of a large amount of depth measurement data (and, in some embodiments, IMU data) to sensor processor 70. Such massive data transmission may not be possible on a typical vessel network, such as a CAN bus or wireless network being used for communication by multiple devices. In some embodiments, sensor processor 70 can be configured to communicate filtered data on the vessel network, such as a CAN bus or wireless network. Additionally or alternatively, a dedicated communication link can be provided between sensor processor 70 and a propulsion controller, such as central controller 24.

In some embodiments, depth sensors 72-78 can include different types of sensors (e.g., depending on the distance between vessel 10 and an object, such as object O). For example, radar sensors can be used to detect objects at further distances, and cameras, sonic sensors, and/or lidar can be used for objects at closer distances. Note that depth camera sensors can be used, alone or in combination with any of the sensors described above, for example, to provide object location information to controller 24. Sensors 72-78 can be placed at positions on vessel 10 so that the sensor is at a height and facing a direction suitable to detect objects that vessel 10 is likely to encounter. Additionally, sensors 72-78 (and/or additional sensors) can be placed to have at least partially overlapping fields of view (e.g., as shown in FIG. 1). Note that optimal sensor positions can vary depending on vessel size and configuration.

In FIG. 1, the depth sensors shown are positioned to observe multiple regions around vessel 10, including the front, sides, and stern of vessel 10, and include a front-facing sensor 72, a front-starboard-facing sensor 73, a starboard-facing sensor 74, a front-port-facing sensor 73, a rear-facing sensor 76, a port-facing sensor 78. In some embodiments, one or more depth sensors can be placed on a hard top of marine vessel 10 and arranged such that the fields of view of the one or more depth sensors, combined, cover the entire 360° area surrounding vessel 10 (although there may be blind spots relatively close to vessel 10, such as where the hull obstructs the field of view). Note also that the relevant controller, such as sensor processor 70, can selectively operate any one or more of various different sensors (e.g., including depth cameras, radars, lidars, ultrasonics, or any other suitable sensor technology) to sense the location of objects in an environment of vessel 10.

In some embodiments, sensor processor 70 can integrate sensor data provided from one or more types of sensor into one or more models of an environment of vessel 10, objects within the environment, and/or vessel 10 itself. In such embodiments, the model(s) can be in any suitable format, such as one or more point clouds, one or more maps, one or more occupancy grids, and/or one or more data structures including a list of surrounding objects (e.g., including the object's size and position). For example, the model can represent location information integrated from multiple sensors. As described above, the location data from different sensors can be translated into a common reference frame (e.g., defined by the global coordinate system).

Autonomous and/or advanced operator assistance (sometimes referred to as semi-autonomous) controls for improved vessel handling qualities generally requires a relatively accurate ability to identify objects in an environment of vessel 10, often using multiple depth sensors mounted on vessel 10. In general, such depth sensors can be positioned to detect the objects in the marine environment surrounding marine vessel 10, such as a dock, a swimmer, or other obstruction in the current path and/or other potential paths of vessel 10. Each sensor can provide location information of features within its field of view relative to its own frame of reference (e.g., in the camera coordinate system associated with that sensor) and/or in a common frame of reference (e.g., in the global coordinate system). For example, the location information can be transformed from the respective camera coordinates at the camera and/or at a controller (e.g., sensor processor 70) using one or more transforms derived during a calibration procedure. Depending on the type of sensor(s), the application of use, boat size, hull shape, etc., multiple sensor types and sensor locations may be required to provide adequate sensing around the marine vessel for operation in all marine environments. To create a cohesive dataset that can be used for purposes of vessel control and vessel navigation, including autonomous vessel navigation and automatic maneuver-limiting control (e.g., velocity limiting for object avoidance, maintenance of a buffer zone, etc.), information from multiple sources (e.g., multiple depth sensors, multiple types of depth sensors, proximity sensors, etc.) can be translated to a common reference frame (the global coordinate system associated with the vessel). To accurately translate the information to the common reference frame typically can require precise knowledge of the posture (e.g., including 3D location, attitude, and/or orientation) of each sensor relative to the common reference frame such that the information received from each sensor can be translated appropriately. Regardless of what type of model(s) is being generated, the relevant sensor installation posture of each sensor on the marine vessel must be known so that the location information from each respective sensor can be properly interpreted for navigation purposes. Note that the posture of each sensor can be calculated or otherwise determined explicitly, however, such information is generally difficult to determine with sufficient accuracy. Alternatively, the posture of each sensor can be implicit in the transforms determined during a calibration or recalibration procedure (e.g., transforms that are optimized using machine learning techniques may not require explicit knowledge of the precise location of the sensors). In some embodiments, a calibration procedure can begin with an initial estimate of camera poses (e.g., based on measurement, a CAD model, data from a sensor associated with an adjustable sensor mount device), and the calibration procedure can include refining the initial estimate (e.g., via an optimization algorithm). Note that data from a sensor can be transformed multiple times (e.g., using a system of transforms) to translate data between a particular camera coordinate system to a global coordinate system. For example, a transform between a particular sensor camera coordinate system (e.g., a first camera coordinate system) and the global coordinate system can be determined (e.g., during a calibration or recalibration procedure), and a transform determined for one or more other sensors (e.g., a second camera coordinate system) can be a transform between the other sensor and the sensor for which the transform between the sensor camera coordinates and global coordinates have been determined. In such an example, both the transform between the second camera coordinate system and the first camera coordinate system and the transform between the first camera coordinate system and the global camera coordinate system can be used to transform data from the second camera to the global coordinate system. In some embodiments, vessel 10 can have a main inertial measurement unit (IMU) installed at a known location on the marine vessel. Referencing the example in FIG. 1, main IMU 36 can be part of an inertial navigation system (INS) such as including one or more micro-electro-mechanical systems (MEMS). For example, INS 60 can include a MEMS angular rate sensor, such as a rate gyro, a MEMS accelerometer, and a magnetometer. Such INS systems are well known in the relevant art. Additionally or alternatively, in some embodiments, motion and angular position (including pitch, roll, and yaw) can be sensed by a differently configured INS 60, or by an attitude heading reference system (AHRS) that provides 3D orientation of vessel 10 by integrating gyroscopic measurements, accelerometer data, and magnetometer data. In some embodiments, INS 60 can receive orientation information from main IMU 36 and can also receive information from a GPS receiver 40 comprising part of a satellite-based radio navigation system (e.g., a global navigation satellite system (GNSS)), such as the global positioning system (GPS). GPS receiver 40 can be located at a pre-selected fixed position on vessel 10, which provides information related to a position of vessel 10 with respect to a geographic and/or planetary frame of reference (e.g., latitude, longitude, and height with respect to sea level). In some embodiments, main IMU 36 can also be located at a known and fixed position with respect to the center of rotation (COR) and/or center of gravity (COG) of vessel 10 (e.g., a COG when the vessel is empty).

In some embodiments, IMU data from each sensor IMU 62-68 and/or main IMU 36 can be provided to sensor processor 70 and/or to another controller (e.g., CCM 24, INS 60, etc.). For example, the IMU data from each sensor IMU 62-68 can be transmitted along with the feature location information from the respective depth sensor 72-78. Additionally or alternatively, in some embodiments, each sensor IMU 62-68 can have an integrated microprocessor configured to process the respective sensor IMU data and compare the sensor IMU data to main IMU data and determine whether the sensor IMU data is inconsistent with the main IMU data based on the relative location of the sensor IMU with respect to main IMU 36. In some embodiments, as shown in FIG. 1, depth data and/or IMU data can be communicated to sensor processor 70 (and/or any other suitable controller), which can be via any suitable wired or wireless communication technique(s), such as via a dedicated communication bus, wireless transmission protocols (e.g. Bluetooth, Bluetooth Low Energy, ZigBee, etc.), a CAN bus comprising part of the vessel network, etc. Note that the dashed connection lines in FIG. 1 are meant to show only that the various control elements are capable of communicating with one another, and do not necessarily represent actual wiring connections between the control elements, nor do they represent the only paths of communication between the elements.

In some embodiments, some sensor processing functions can be performed by a separate computing device. For example, sensor processor 70 can communicate processed sensor data to central controller 24, which can utilize the processed data for navigation functions and/or other vessel control functions. In some embodiments, sensor processor 70 can be a dedicated, special-purpose computing system configured to process depth data and/or IMU data from depth sensors 72-78, sensor IMUs 62-68, and/or main IMU 36, and/or generate image data (e.g., which can be used to present an image of the environment to an operator, such as a portion of the environment that the operator cannot see from the operator's position). As described below, in some embodiments, sensor processor 70 can be associated with its own storage system comprising memory and its own processing system that executes programs and accesses data stored in the memory of sensor processor 70. Additionally or alternatively, in some embodiments, one or more functions described as being performed by sensor processor 70 can be incorporated in a multi-purpose controller, such as sensor processor software stored and executed within controller 24. For example, in some embodiments, controller 24 can control marine vessel navigation, such as autonomous point-to-point navigation, automatic docking, station keeping, auto-heading, waypoint tracking, and/or other advanced operator assistance programs. In some embodiments, central controller 24 can also perform one or more sensor processing functions. Additionally or alternatively, in some embodiments, functions described herein as comprising part of the sensor processor functions can be distributed across two or more processing devices. For example, each depth sensor 72-78 can include one or more processors that are configured to perform certain functions (e.g., segmenting image data to classify one or more objects in the image, generate one or more RGBD images, generate one or more 3D depth maps, generate a point cloud corresponding to the 3D depth map, project points into a global coordinate system). As another example, each IMU 62-68 can include (or otherwise be associated with) one or more processors that are configured to perform calculations to interpret measured IMU data (such as to determine an attitude estimate for the respective IMU) and provide the interpreted IMU data to one or more other processing devices or controllers for execution of subsequent processing steps.

In some embodiments, vessel 10 can include a magnetometer system 37 in lieu of, or in addition to, a magnetometer of INS 60. Alternatively, although shown as a separate component, magnetometer 37 can be the magnetometer of INS 60. In some embodiments, magnetometer system 37 can be implemented as a triaxial magnetometer that senses magnetic field strength on each of multiple axes (e.g., on X, Y, and Z axes). In some embodiments, magnetometer system 37 can include a solid state magnetoresistive-based magnetometer that operates in accordance with principles of magnetoresistance (e.g., an increase in resistivity occurs when an electrical current is oriented in the same direction as a magnetic field, and a decrease in resistivity occurs when the electrical current is oriented perpendicular to the field). In some embodiments, magnetometer system 37 can be part of a navigation system that includes GPS receiver 40, INS 60, IMUs 62-68, and/or a vision system (e.g., including sensors 72-78). Signals from various sources of navigational data, such as GPS receiver 40, magnetometer system 37, INS 60, vision system, etc., can be provided to sensor processor 70 and/or controller 24 and together can be used to calculate navigation parameters, such as velocity and heading of the marine vessel (e.g., relative to a reference, such as magnetic north). In some embodiments, motion and angular position (including pitch and roll) can be sensed by a different navigation system configuration that provides 3D orientation of the marine vessel 10 by integrating gyroscopic measurements, accelerometer data, and magnetometer data from the magnetometer system 37.

In some embodiments, sensor processor 70 can be programmed and/or otherwise configured to automatically predict magnetic and/or location sensor errors using a vision system or vessel 10 and/or to automatically mitigate magnetic and/or location sensor errors. For example, sensor processor 70 can adjust reliance on one or more sources of navigation data within a sensor fusion process used to determine one or more navigation parameters of vessel 10 (e.g., as described below in connection with FIGS. 3 to 9). In some embodiments, processors of vessel 10, such as sensor processor 70, can access computer-readable code and, upon executing the code, carry out one or more functions, such as magnetic and/or location sensor error prediction and mitigation functions, as described in detail below.

Figure 2:
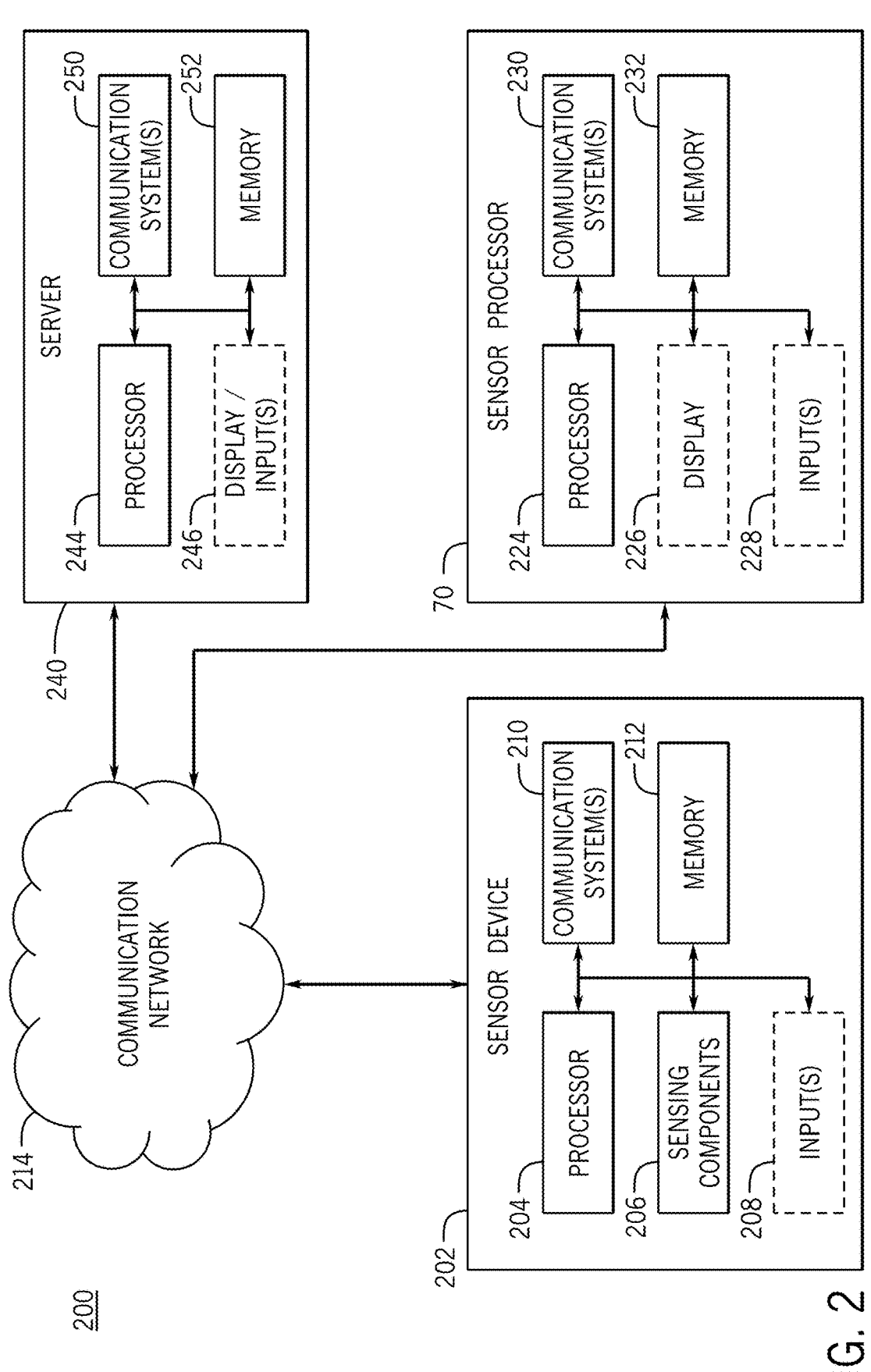
FIG. 2 shows an example of hardware that can be used to implement a sensor device, a sensor processor, and a server in accordance with some embodiments of the disclosure.

FIG. 2 shows an example of hardware 200 that can be used to implement a sensor device 202 sensor processor 70, and a server 240 in accordance with some embodiments of the disclosed subject matter.

As shown in FIG. 2, in some embodiments, sensor device 202 can include a processor 204, sensing components 206, one or more inputs 208, one or more communication systems 210, and/or memory 212. In some embodiments, processor 204 can be any suitable hardware processor or combination of processors, such as a central processing unit (CPU), an accelerated processing unit (APU), a graphics processing unit (GPU), a field programmable gate array (FPGA), an application specific integrated circuit (ASIC), a microcontroller, etc.

In some embodiments, sensing components can include components that are used to determine a three-dimensional location of an object and/or other feature of an environment (e.g., a water surface) that is within a field of view of sensor device 202, and/or to capture image data of a scene within a field of view of sensor device 202. In some embodiments, sensor device 202 can include components used to implement one or more of depth sensors 72-78.

For example, sensor device 202 can be implemented as one or more cameras that include components that facilitate three-dimensional imaging of a region of an environment, such as a stereoscopic camera, a structured light camera, a continuous-wave time-of-flight camera, a direct time-of-flight camera, etc. As another example, depth sensor device 202 can be implemented as one or more lidar devices (e.g., a scanning lidar, a lidar including a 2D array sensor, etc.) that include components that facilitate three-dimensional characterization of a region of an environment. In such an example, a camera(s) (e.g., a two-dimensional camera) can be located to have an overlapping field of view with a lidar device (e.g., such a camera can be co-located), and can be used to capture images that can be used to classify portions of the environment (e.g., using a machine learning model trained to perform image segmentation, object detection, etc.). As yet another example, sensor device 202 can be implemented as one or more sound-based devices (e.g., one or more sonar systems, etc.) that include components that facilitate three-dimensional characterization of a region of an environment. As still another example, sensor device 202 can be implemented as one or more radio wave-based devices (e.g., one or more radar systems, etc.) that include components that facilitate three-dimensional characterization of a region of an environment.

In some embodiments, inputs 208 can include any suitable input devices and/or sensors that can be used to receive user input, such as a keyboard, a mouse, a touchscreen, a touchpad, a microphone, a camera, etc. In some embodiments, sensor device 202 can omit inputs (e.g., where sensor device 202 is an embedded device, or where sensor device 202 is not configured for direct end user operation).

In some embodiments, communications systems 210 can include any suitable hardware, firmware, and/or software for communicating information over a communication network 214 and/or any other suitable communication networks. For example, communications systems 210 can include one or more transceivers, one or more communication chips and/or chip sets, etc., that can be used to establish a wired and/or wireless communication link. In a more particular example, communications systems 210 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 212 can include any suitable storage device or devices that can be used to store instructions, values, etc., that can be used, for example, by processor 204 to perform processes described herein, to generate depth information of a portion of the environment that characterizes the portion of the environment in three-dimensions, to identify and/or classify one or more objects and/or other features in a scene based on the depth information and/or image information, to communicate with sensor processor 70 via communications system(s) 210, etc. Memory 212 can include any suitable volatile memory, non-volatile memory, storage, or any suitable combination thereof. For example, memory 212 can include random access memory (RAM), read-only memory (ROM), electronically erasable programmable read-only memory (EE-PROM), one or more flash drives, one or more hard disks, one or more solid state drives, one or more optical drives, etc.

In some embodiments, sensor device 202 can include any suitable display device(s) (not shown), such as a computer monitor, a touchscreen, a television, etc.

In some embodiments, memory 212 can have encoded thereon a computer program for controlling operation of sensor device 202. In such embodiments, processor 204 can execute at least a portion of the computer program to generate depth information, to identify and/or classify one or more objects and/or other features in a scene based on the depth information and/or image information, to transmit information to sensor processor 70, to execute at least a portion of a process for predicting and/or mitigating magnetic and/or location sensor errors, such as one or more portions of processes described below in connection with FIGS. 3 to 9, etc.

In some embodiments, other types of sensors, such as a magnetometer, can include similar components to sensor device 202 (e.g., a processor, sensing components, communication system(s), and/or memory), with appropriate sensor components to perform functions of the sensor device (e.g., a magnetometer can include magnetoresistive sensing components).

In some embodiments, communication network 214 can be any suitable communication network or combination of communication networks. For example, communication network 214 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, 5G NR, etc.), a wired network, etc. In some embodiments, communication network 214 can include one or more portions of a control area network (CAN), a local area network (LAN), a wide area network (WAN), a public network (e.g., the Internet, which may be part of a WAN and/or LAN), any other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

In some embodiments, sensor processor 70 can include a processor 224, a display 226, one or more inputs 228, one or more communications systems 230, and/or memory 232. In some embodiments, processor 224 can be any suitable hardware processor or combination of processors, such as a CPU, an APU, a GPU, an FPGA, an ASIC, a microcontroller, etc. In some embodiments, display 226 can include any suitable display devices, such as a computer monitor, a touchscreen, a television, etc. In some embodiments, inputs 228 can include any suitable input devices and/or sensors that can be used to receive user input, such as a keyboard, a mouse, a touchscreen, a microphone, etc. In some embodiments, sensor processor 70 can omit inputs (e.g., where sensor processor 70 is an embedded device that is not configured for direct user interaction). For example, sensor processor 70 can provide results of an analysis, image data, and/or a portion of a user interface to CCM 24, and CCM 24 can use the results, image data, and/or user interface to execute at least a portion of a process(es) described herein, present an image(s), present a user interface, etc.

In some embodiments, communications systems 230 can include any suitable hardware, firmware, and/or software for communicating information over communication network 214 and/or any other suitable communication networks. For example, communications systems 230 can include one or more transceivers, one or more communication chips and/or chip sets, etc., that can be used to establish a wired and/or wireless communication link. In a more particular example, communications systems 230 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 232 can include any suitable storage device or devices that can be used to store instructions, values, etc., that can be used, for example, by processor 224 to analyze image data and/or depth information received from sensor device 202 (and/or any other suitable depth sensor device), to identify and/or classify one or more objects and/or other features in a scene based on the depth information and/or image information, to communicate with depth sensor device 202 via communications system(s) 230, etc. Memory 232 can include any suitable volatile memory, non-volatile memory, storage, or any suitable combination thereof. For example, memory 232 can include RAM, ROM, EEPROM, one or more flash drives, one or more hard disks, one or more solid state drives, one or more optical drives, etc.

In some embodiments, memory 232 can have encoded thereon a computer program for controlling operation of sensor processor 70. In such embodiments, processor 224 can, analyze depth information to identify and/or classify one or more objects and/or other features in a scene based on the depth information and/or image information, to receive information from sensor device 202, to identify objects in an environment of a marine vessel (e.g., using images captured by one or more sensor devices) that are likely to degrade sensor signal reliability from one or more navigation sensors, to determine whether the object is in a location to degrade sensor signal reliability, to reduce reliance on the likely degraded sensor signal within a sensor fusion process used to determine one or more navigation parameters of a marine vessel, to determine one or more navigation parameters of the marine vessel, to execute at least a portion of a process for predicting and/or mitigating magnetic and/or location sensor errors, such as one or more portions of processes described below in connection with FIGS. 3 to 9, etc.

In some embodiments, server 240 can include a processor 244, a display and/or input(s) 246, a communication system(s) 250, and/or memory 252. In some embodiments, processor 224 can be any suitable hardware processor or combination of processors, such as a CPU, an APU, a GPU, an FPGA, an ASIC, a microcontroller, etc.

In some embodiments, display and/or input(s) 246 can include any suitable display devices, such as a computer monitor, a touchscreen, a television, etc., and/or can include any suitable input devices and/or sensors that can be used to receive user input, such as a keyboard, a mouse, a touchscreen, a microphone, etc. In some embodiments, server 240 can omit display/input(s) 246 (e.g., where sensor processor server 240 is not configured for direct user interaction). For example, server 240 can communicate with another computing device (e.g., sensor processor 70, CCM 24, a mobile computing device, a personal computer, etc. to provide results of an analysis, data, a portion of a user interface, etc., and CCM 24 (or any other suitable device) can use the results, image data, and/or user interface to execute at least a portion of a process(es) described herein, present an image(s), present a user interface, etc.

In some embodiments, communications systems 250 can include any suitable hardware, firmware, and/or software for communicating information over communication network 214 and/or any other suitable communication networks. For example, communications systems 250 can include one or more transceivers, one or more communication chips and/or chip sets, etc., that can be used to establish a wired and/or wireless communication link. In a more particular example, communications systems 250 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 252 can include any suitable storage device or devices that can be used to store instructions, values, etc., that can be used, for example, by processor 244 to communicate with sensor device 202, sensor processor 70, CCM 24, etc., via communications system(s) 250, etc. Memory 232 can include any suitable volatile memory, non-volatile memory, storage, or any suitable combination thereof. For example, memory 252 can include RAM, ROM, EEPROM, one or more flash drives, one or more hard disks, one or more solid state drives, one or more optical drives, etc.

In some embodiments, memory 252 can have encoded thereon a computer program for controlling operation of server 240. In such embodiments, processor 244 can: maintain a database of disturbance information (e.g., which can include locations of disturbance objects, disturbance areas, information indicative of a magnitude of sensor disturbance associated with an object and/or area, information indicative of a direction of sensor disturbance associated with an object and/or area, etc.), receive disturbance data to add to a database of disturbance data, provide disturbance data to one or more client devices (e.g., vessels 10, a mobile computing device, etc.), receive information from sensor device 202, sensor processor 70, CCM 24, etc., to execute at least a portion of a process for predicting and/or mitigating magnetic and/or location sensor errors, such as one or more portions of processes described below in connection with FIGS. 3 to 9, etc.

Figure 3:
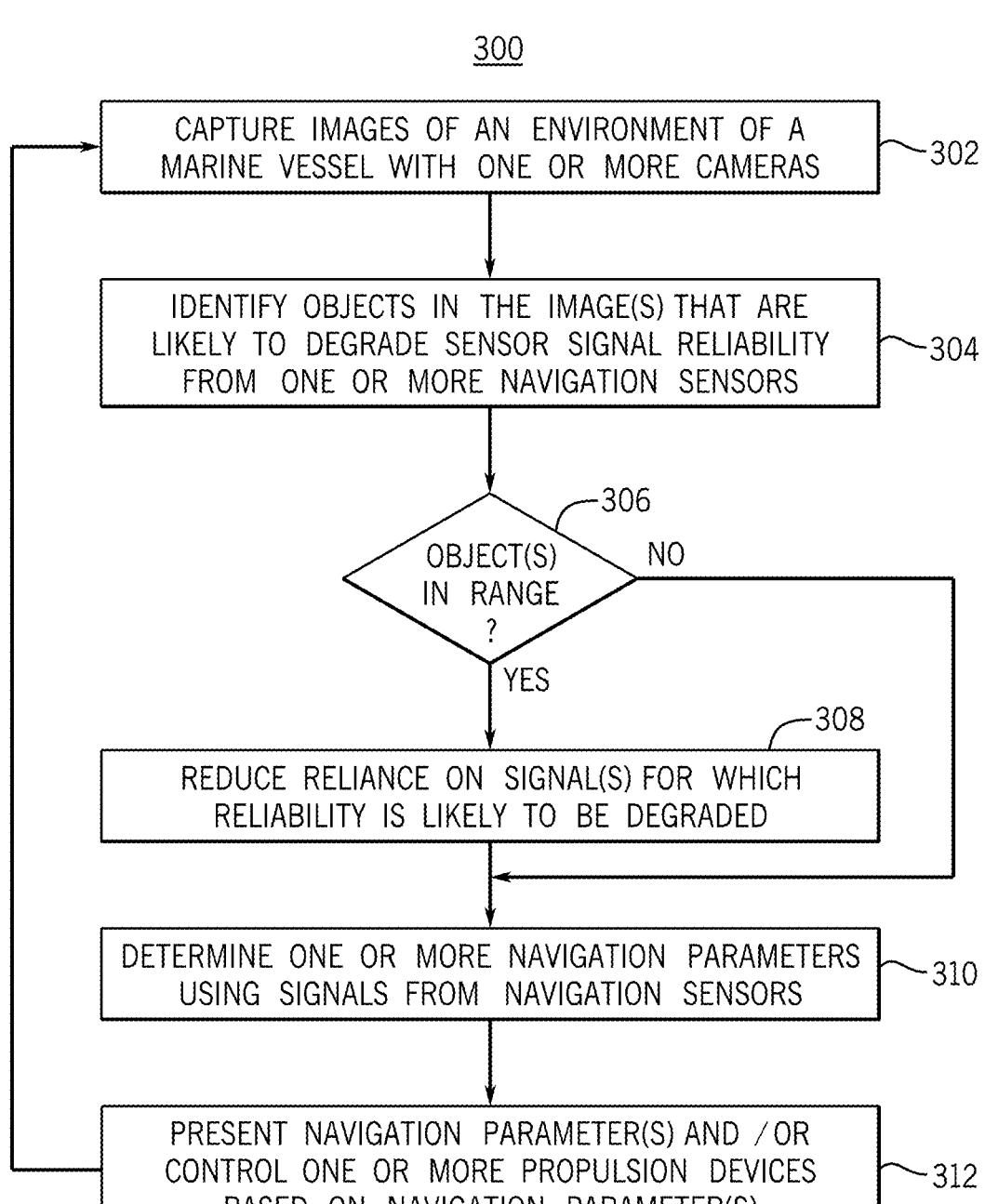
FIG. 3 shows an example of a process for predicting and mitigating sensor errors using a vision system of a marine vessel in accordance with some embodiments of the disclosure.

FIG. 3 shows an example of a process 300 for predicting and mitigating sensor errors using a vision system of a marine vessel in accordance with some embodiments of the disclosure.

At 302, process 300 can capture (and/or receive) one or more images of an environment of a marine vessel with one or more cameras. In some embodiments, process 300 can capture an image(s) of an environment of the marine vessel using any suitable imaging device, such as one or more of sensors 72-78.

At 304, process 300 can identify one or more objects in the image data that are likely to degrade sensor signal reliability from one or more navigation sensors. In some embodiments, process 300 can use any suitable technique or combination of techniques to identify an object(s) likely to degrade sensor signal reliability from one or more navigation sensors in image data captured and/or received at 302.

In some embodiments, process 300 can use image data from the one or more cameras to detect objects in the environment that are predicted to cause a disturbance to a signal from one or more sensors. For example, in some embodiments, process 300 can use a trained machine learning model that has been trained to identify objects that are likely to disturb a sensor, such as a magnetometer or a satellite navigation receiver. In a more particular example, the trained machine learning model can be trained to identify objects that can cause a disturbance in magnetic fields (e.g., the Earth's magnetic field), such as objects that include ferromagnetic materials (e.g., steel bridges, docks with steel and/or iron components, cargo ships, etc.). In such an example, process 300 can use a trained machine learning model that is trained to predict to which class of a set of classes objects in the image are most likely to correspond (e.g., a model trained to perform image segmentation, a model trained to perform object recognition, etc.), in which a subset of classes are objects that are likely to cause a disturbance in a magnetic field (e.g., the set of classes can include a magnetic disturbance bridge and a non-magnetic disturbance bridge class, a magnetic disturbance dock class and a non-magnetic disturbance dock class, etc.). Additionally or alternatively, process 300 can be a trained machine learning model that is trained to predict to whether an object in a particular class or classes is likely to cause a disturbance in a magnetic field (e.g., image data corresponding to objects that may cause a magnetic disturbance can be provided to a trained machine learning model that is trained to predict whether the object in the image data is likely to cause a magnetic disturbance). Note that a single machine learning model can be trained to predict whether multiple classes of objects are likely to cause a disturbance (e.g., using image data of the object), or multiple machine learning models can be trained, each trained to predict whether a particular class of object is likely to cause a disturbance.

In another more particular example, a trained machine learning model can be trained to identify objects that can cause a disturbance in signals received by a satellite navigation receiver (e.g., GPS signals), such as objects that block satellite navigation signals (e.g., overhead objects, relatively tall and large objects, etc.) and/or that cause noise, such as multipath noise. In some embodiments, in addition to, or in lieu of, using a trained machine learning model, process 300 can determine whether an object is likely to cause a disturbance in signals received by a satellite navigation receiver based on the size and location of the object(s) with respect to the satellite navigation receiver (e.g., in a model of the environment, such as a point cloud and/or occupancy grid). For example, in some embodiments, process 300 can use such a trained machine learning model to identify objects that can cause a disturbance in signals received by the satellite navigation receiver from image data when the object is relatively far from the image sensors (e.g., more than 100 meters), and process 300 can associate a portion of a model of the environment with the object. In such an example, as the marine vessel approaches the object, the model of the environment can be updated (e.g., based on subsequently captured image data), and a size and location of the object can be more accurately determined, and the model can be used to determine whether the object is likely to cause a disturbance in the satellite navigation signals (e.g., based on the relative locations of the marine vessel and the object). Many satellite navigation systems require that a receiver detect signals from a minimum number of navigation satellites (e.g., at least three, at least four). If process 300 determines that an object is in a position to cause the number of signals detected by the receiver to be fewer than the minimum, process 300 can identify the object as an object that is likely to cause a disturbance in signals received by the satellite navigation receiver.

In some embodiments, process 300 can generate and/or utilize segmentation information (e.g., based on one of more of the images captured and/or received at 302) to identify an object(s) that is likely to degrade sensor signal reliability from one or more navigation sensors. As described below in connection with FIG. 10, in some embodiments, the segmentation information can include classification information that indicates which of a set of classes different portions of the image are most likely to correspond. In some embodiments, the set of classes can include classes that are relatively likely for the vessel to encounter (e.g., in a marine environment). For example, the set of classes can include one or more classes of bodies of water, such as one or more broad class of water feature, and/or multiple more specific classes of water features. As another example, the set of classes can include one or more classes of structure, such as one or more broad class of structural feature (e.g., structure), and/or multiple more specific classes of structural features (e.g., dock, bridge, building, sea wall or more specific classes such as concrete sea wall or rock sea wall, etc.). As yet another example, the set of classes can include one or more classes of vessel, such as one or more broad class of vessel feature (e.g., vessel, boat, motor vehicle, etc.), and/or multiple more specific classes of vessel features (e.g., boat, large boat, small boat, personal watercraft or more specific classes such as jet ski, sail boat, human-powered watercraft or more specific classes such as: canoe; kayak; or standup paddle board, etc.). In such an example, the segmentation information can include a class corresponding to features of the vessel associated with the camera(s) that captures the image (e.g., an ego vessel class). As still another example, the set of classes can include one or more classes of vegetation, such as one or more broad class of vegetation feature, and/or multiple more specific classes of vegetation features (e.g., trees, brush, algae, etc.). As a further example, the set of classes can include one or more classes of navigation aid, such as one or more broad class of navigation aid feature (e.g., navigation aid), and/or multiple more specific classes of navigation aid features (e.g., channel marker, buoy, sign, specific types of signs, etc.). As another further example, the set of classes can include one or more classes of open space and/or land, such as one or more broad class of sky feature and/or land feature, and/or multiple more specific classes of sky features and/or specific classes of land.

In some embodiments, process 300 can generate the segmentation information using any suitable technique or combination of techniques, and the segmentation information can be in any suitable format. For example, process 300 can provide one or more images to a trained machine learning model that was trained to generate segmentation information classifying regions (e.g., each corresponding to one or more pixels of the image) as most likely belonging to a certain class and/or a probability of the region corresponding to each of various classes. In such an example, process 300 can receive the segmentation information from the trained machine learning model.

In some embodiments, the segmentation information can be formatted using any suitable format. For example, the segmentation information can be formatted as a set of masks, each corresponding to a particular class, where a particular value (e.g., a binary 1) indicates that the class is likely present at a region (e.g., a pixel or group of pixels), and another value (e.g., a binary 0) indicates that the class is likely not present at a region. In such an example, the segmentation information can be formatted as a matrix having rows and columns equal to the rows and columns of the image provided to the trained machine learning model. As another example, the segmentation information can be formatted as a set of masks, each corresponding to a particular class, where a value (e.g., in a range of 0 and 1) indicates a likelihood that the class is present at a region (e.g., a pixel or group of pixels). As yet another example, the segmentation information can be formatted as an image in which a color at each pixel indicates a classification of the pixel (e.g., "sky" can be encoded with RGB brightness values (r,g,b) using an eight bit scale, for example as rgb=(0,0,255)). In such an example, the pixel may or may not be associated with a confidence value (e.g., class can be encoded using one or more of the red, green, and blue channels, and confidence can be encoded in a channel not used to encode class, which may or may not be a color channel). Note that the image captured by the camera (and/or received) at 302 may have a different number of rows and/or columns than the image provided to the trained machine learning model. The image received from the camera may have more pixels (e.g., it may be a higher resolution) than the image provided to the trained machine learning model, as the trained machine learning model may require an image with a particular number of pixels as input, and/or a particular number of color channels (e.g., a gray-scale image with a single channel, a color image with multiple color channels, etc.). In some embodiments, the machine learning model can be trained to utilize depth information (e.g., in a depth channel of the image provided to the machine learning model). Additionally or alternatively, in some embodiments, depth information can be used to supplement the segmentation information (e.g., to check, confirm, and/or refine the segmentation to confirm that the object has dimensions consistent with the class indicated in the segmentation information).

In some embodiments, the image provided to the machine learning model at 304 can be an image captured by a camera at 302 that is also used to generate depth information. As another example, the image provided to the machine learning model at 304 can be an image captured by a camera at 302 that is not used to generate depth information. In such an example, the image can be an image from an image sensor that is co-located with a depth sensor used to generate depth information and having a field of view that encompasses at least a portion of the field of view of the depth sensor. In a particular example, sensor device 202 can include two monochromatic image sensors that are used for stereoscopic depth sensing, and a color (e.g., RGB) image sensor that can be used for segmentation, display, etc.

In some embodiments, one or more additional trained machine learning models (and/or other computer vision techniques) can be used to provide supplemental information that can be used to label the segmentation information, or can be used in lieu of the segmentation information. For example, if the trained machine learning model identifies a region of an image as corresponding to a particular class that may or may not interfere with magnetometer signals (e.g., a dock, a bridge, etc.), at least that a portion of image data corresponding to that object(s) can be provided to a trained machine learning model that is trained to classify the object based on whether it is likely to interfere with a magnetometer (e.g., based on whether the object is likely to include a substantial amount of ferromagnetic material. As another example, process 300 can use one or more trained machine learning models that generate object detection information (e.g., as bounding boxes for a portion of an image including a particular class of object) in lieu of, or in addition to, the segmentation information.

As another example, process 300 can obtain classification information from a database or map, and can use such classification information in addition to, or in lieu of, the segmentation information. In such an example, the database or map can include certain relatively persistent features of the environment (e.g., structural features, navigation aid features, land features, etc.). Such information can be used to supplement and/or confirm the segmentation information. Alternatively, such information can be used to classify objects in an environment around the vessel based on the location of the vessel and the location of the features in the database or map (e.g., as described below in connection with FIG. 7).

In some embodiments, process 300 can identify objects that belong in one or more particular classes as objects that are likely to interfere with sensor signal reliability from one or more navigation sensors, and can disregard objects that belong in one or more other particular classes. For example, process 300 can identify features classified as belonging to particular classes (e.g., dock, bridge, sea wall, etc.) that are likely to interfere with sensor signal reliability from one or more navigation sensors, and can disregard features that belong in one or more other particular classes.

In some embodiments, information about objects in the environment that have been identified as objects that are likely to degrade sensor signal reliability for one or more navigation sensors can be included in an occupancy grid. For example, a processor(s) executing at least a portion of process 300 (and/or any other suitable process, such as processes described herein) the controller(s) can generate and/or update an occupancy grid based on objects identified at 304. In some embodiments, the occupancy grid can be formatted as a data structure in which each element corresponds to a cell of the occupancy grid, and each element is indicative of a probability that the cell is occupied by an object/obstacle. In some embodiments, each cell can represent a volume of the environment (e.g., having a width, depth, and height). For example, each cell can represent a volume that is 0.25 meters (m) by 0.25 m laterally, and extends from a water surface to a height at or above the top of the vessel. In some embodiments, location information corresponding to objects in the environment can be used to generate a model (e.g., using a point cloud) of objects in an environment around the vessel based on the location of the objects. The model of the objects in the environment can be used to identify cells in the occupancy grid that are more likely to contain an obstruction, and those that are less likely. In some embodiments, the occupancy grid can be updated in real-time based on recent measurements of a portion of the environment within a predetermined range of the proximity sensors(s).

In some embodiments, the occupancy grid can include multiple layers (e.g., each cell can be associated with multiple elements) that indicate a probability that the cell is occupied by a particular type of object, and/or that an object in the cell is likely to interfere with a particular navigation sensor(s). For example, each cell can be associated with an element indicative of a probability of any object being present in the cell. As another example, each cell can be associated with an element indicative of a probability of a magnetic disturbance object being present in the cell. As yet another example, each cell can be associated with an element indicative of a probability of a satellite navigation sensor disturbance object being present in the cell.

At 306, process 300 can determine whether one or more of the objects identified at 304 are within a range of a sensor(s) that is likely to cause degradation in sensor signal reliability. In some embodiments, objects that are likely to interfere with certain types of navigation sensors (e.g., magnetometers) can interfere based on a distance between the object and the navigation sensor. For example, as a magnetometer moves closer to a source of magnetic interference (e.g., a metal bridge) the magnitude of the interference can be expected to increase. In such an example, if there are no objects that are likely to interfere with the magnetometer signal within a predetermined range (e.g., about 10 meters (m)), process 300 can determine that there are no objects that are likely to interfere with the magnetometer signal within range.

Additionally or alternatively, in some embodiments, objects that are likely to interfere with certain types of navigation sensors (e.g., satellite navigation receivers) can interfere based on the position of the object with respect to the location of the navigation sensor and size of the object with respect to a distance between the object and the navigation sensor. For example, as a satellite navigation receiver moves into an area that has a line of sight to fewer than a minimum number of navigation satellites (e.g., under a bridge), performance of the satellite navigation receiver can be expected to rapidly decline (e.g., when less than the minimum number of signals are received). In such an example, if there are no objects that occupy more than a threshold portion of the sky, process 300 can determine that there are no objects that are likely to interfere with the satellite navigation signal within range.

Additionally or alternatively, in some embodiments, process 300 can analyze a portion of an occupancy grid near the vessel, and if there are any objects present within the local area near vessel, and can determine whether there are an objects that are likely to interfere with a navigation sensor within range.

In some embodiments, process 300 can estimate an impact of an object on one or more sensors (e.g., as described below in connection with 406 and/or 506), and can determine whether there is an object within range based on whether an estimated disturbance from all objects is over a threshold (e.g., for a particular sensor).

If process 300 determines that one or more objects that are likely to cause degradation in sensor signal reliability are in range ("YES" at 306), process 300 can move to 308.

At 308, process 300 can reduce reliance on a signal(s) from the impacted sensor(s) for which reliability is likely to be degraded. In some embodiments, process 300 can reduce reliance on a signal(s) from the impacted navigation sensor (s) using any suitable technique or combination of techniques. For example, process 300 can exclude signals from the impacted navigation sensor from being used to determine a navigation parameter (e.g., as described below in connection with 914 of FIG. 9). As another example, process 300 can reduce a weight associated with signals from the impacted sensor (e.g., based on the estimated impact of the object(s) in the environment, as described below in connection with 920 of FIG. 9). As yet another example, process 300 can cause a disturbance rejection filter to be utilized in a sensor fusion process that mitigates errors in signals from the impacted sensor (e.g., as described below in connection with 926 of FIG. 9).

In some embodiments, reducing reliance on signals from sensors that are likely to be impacted by an object in the environment can facilitate utilizing more reliable sources of navigation signals, reducing reliance on data that is predicted to be unreliable (e.g., predicted using the vision system of the vessel, at 304). In some embodiments, reducing reliance on unreliable data (e.g., magnetometer data, satellite navigation data, etc.) can increase an influence of other data sources on a navigation parameter (e.g., visual odometry, course over ground (COG), motion data from one or more IMUs, etc.). For example, if the magnetometer data is unreliable, visual odometry, COG before and/or after the data became unreliable, and/or motion data from an IMU(s) can be used to estimate a navigation parameter that can be estimated using the magnetometer data (e.g., heading). As another example, if the satellite navigation data is unreliable, visual odometry, recent COG before the data became unreliable, and/or motion data from an IMU(s) can be used to estimate a navigation parameter that can be estimated using the satellite navigation data (e.g., COG).

Otherwise, if process 300 determines that no objects that are likely to cause degradation in sensor signal reliability are in range ("NO" at 306), process 300 can move to 310.

At 310, process 300 can determine one or more navigation parameters using signals from one or more navigation sensors. In some embodiments, process 300 can generate any suitable navigation parameter(s), such as a heading of the vessel, a location of the vessel, a speed of the vessel, a COG, etc.).

In some embodiments, process 300 can calculate the navigation parameter(s) using any suitable technique or combination of techniques. For example, process 300 can use any suitable sensor fusion technique(s) to determine a navigation parameter(s), such as a Kalman filter-based sensor fusion technique, a complementary filter-based sensor fusion technique (e.g., each sensor signal associated with a filter gain that determines how much the signal contributes to the navigation parameter), a particle filter-based technique, a Bayesian network-based sensor fusion technique, etc.

At 312, process 300 can present the navigation parameter (s) determined at 310, can use one or more navigation parameters determined at 310 to control one or more propulsion devices, and/or can use one or more navigation parameters determined at 310 to perform any other suitable autonomous control and/or advanced operator assistance control.

For example, process 300 can present a heading, location, speed, course, course over ground, etc., determined at 310 on a multi-function display (e.g., as a value, as a graphical representation, etc.) that an operator of the vessel can utilize during navigation.

As another example, process 300 can utilize a heading determined at 310 during operations that may utilize heading (such as joystick operation, station keeping, auto-heading, waypoint tracking, etc.). For example, closed loop control algorithms can be expected to require less input from an operator to maintain a desired course and/or heading, and thus operation under closed loop control is often preferable. However, since closed loop control relies on the accuracy of the navigation parameters (e.g., heading and turn rate measurements of the vessel), if a navigation parameter(s) is unreliable, closed loop control may not be feasible. In a particular example, if an operator uses a joystick (e.g., joystick 30) to command that the vessel move laterally (e.g., to starboard), a controller of the vessel (e.g., CCM 24) can control a magnitude and direction of thrust generated by propulsion devices (e.g., propulsion devices 12*a*, 12*b*) to achieve lateral movement. During the lateral movement, the controller can utilize signals from one or more navigation sensors (e.g., a magnetometer) to confirm that the thrust provided by the propulsion devices is resulting in the commanded movement (e.g., if the heading remains relatively constant while thrust is applied, the controller can confirm that the thrust is not causing the vessel to yaw). In such an example, if signals from the magnetometer are unreliable (e.g., because the vessel is near a dock that includes a significant amount of ferromagnetic material), the controller may not be able to determine, from the magnetometer signals, whether the vessel is maintaining a consistent heading, or the vessel may be maintaining a consistent heading, but the controller causes the vessel to yaw due to inaccurate signals from the magnetometer (e.g., potentially causing the vessel to collide with an object, such as the dock). Additional description related to closed-loop and open-loop control is included in U.S. Pat. No. 10,926,855, which hereby incorporated by reference herein in its entirety.

In another particular example, a vessel can be instructed to autonomously maintain a location and heading (e.g., in a station keeping mode). In such an example, the controller can use signals from one or more navigation sensors (e.g., a magnetometer) to confirm that a consistent heading is being maintained and/or to correct a heading if the heading changes (e.g., due to wind, current, etc.), and can use signals from one or more navigation sensors (e.g., a satellite navigation receiver) to confirm that a consistent location is being maintained and/or to correct a location if the location changes (e.g., due to wind, current, etc.). In such an example, if signals from the magnetometer and/or satellite navigation receiver are unreliable (e.g., because the vessel is near an overhead object that includes a significant amount of ferromagnetic material, such as a bridge), the controller may not be able to determine, from the navigation sensor signals, whether the vessel is maintaining a consistent heading and location, or the vessel may be maintaining a consistent heading and location, but the controller causes the vessel to change heading and/or location due to inaccurate signals from the sensor(s) (e.g., potentially causing the vessel to collide with an object, such as the bridge). Additional description related to station keeping are included in U.S. Pat. No. 8,417,399, which is hereby incorporated by reference herein in its entirety.

FIG. 4 shows an example of a process 400 for predicting and mitigating magnetic sensor errors using a vision system of a marine vessel in accordance with some embodiments of the disclosure.

At 402, process 400 can capture (and/or receive) one or more images of an environment of a marine vessel with one or more cameras, using any suitable technique or combination of techniques, such as techniques described above in connection with 302 of FIG. 3.

At 404, process 400 can identify one or more objects in the image that are likely to degrade reliability of a signal(s) from a magnetometer, using any suitable technique or combination of techniques. For example, in some embodiments, process 400 can use techniques described above in connection with 304 of FIG. 3.

At 406, process 400 can estimate a magnitude of an impact on the magnetometer signal based on the sensor location, the object mass, and the object location, using any suitable technique or combination of techniques.

In some embodiments, process 400 can use 3D location information of one or more portions of an object identified at 404 to estimate the size and/or shape of the object. As described above in connection with FIG. 1, a vision system of a vessel executing at least a portion of process 400 can determine 3D location information of portions of an environment (e.g., using stereoscopic cameras), and can generate a 3D model of at least a portion of the environment based on the 3D location information (e.g., projecting 3D points from each camera coordinate system to a global coordinate system shared by multiple depth sensors), such as a point cloud. In some embodiments, 3D points in a model (e.g., a point cloud) can be associated with particular objects in the environment (e.g., a dock, a bridge, a sea wall, another vessel, water, etc.) based on a classification of portions of the environment (e.g., via segmentation and/or object detection).

In some embodiments, process 400 can estimate a size and/or shape of one or more objects identified at 404 based on a 3D model that includes the object (e.g., a point cloud that includes points associated with the object). For example, in some embodiments, process 400 can use points associated with a particular object (or portion of an object, such as a portion that is and/or was within a FOV of the vision system of the vessel) to estimate a size and/or shape of the object. In a more particular example, process 400 can generate a surface based on the point cloud data associated with the object(s) identified at 404 using any suitable technique or combination of techniques (e.g., using primitives such as polygons, using a spline surface(s), using a bounding box(s), using a convex hull(s), etc.)

In some embodiments, process 400 can use one or more techniques to predict a shape and/or size of a portion of an object(s) identified at 404 that are outside of a FOV of the vision system (e.g., points that are not included, or not yet included, in a 3D model of the environment). For example, process 400 can use one or more point cloud completion techniques (e.g., point-based techniques, view-based techniques, convolution-based techniques, generative adversarial network (GAN)-based techniques, transformer-based techniques, etc., which are described in Fei et al., "Comprehensive Review of Deep Learning-based 3D Point Cloud Completion Processing and Analysis," arxiv (dot) org arXiv: 2203.03311v3 (2022)) to add point cloud points corresponding to a portion(s) of an object that is hidden (e.g., by another object, by a visible portion of the object, etc.). In such an example, process 400 can use point cloud data that includes the added points to determine a size and/or shape of the object. Additionally or alternatively, as another example, process 400 can use information from another source (e.g., an occupancy grid, a chart, a map, a database, etc.) to predict a shape and/or size of an object(s) including portions that may be outside of a FOV. In such an example, the alternate data source(s) can include label information indicative of a class of an object in the environment, and process 400 can estimate the shape and/or size of the object based on the alternate data source(s) if the object identified using the vision system corresponds to the object in the alternative data source (e.g., as described below in connection with 716 of FIG. 7).

In some embodiments, process 400 can estimate a centroid of the object based on the size and/or shape of the object, which can be used as a location of the object to estimate an impact of the object on a magnetometer signal. Additionally or alternatively, in some embodiments, process 400 can utilize a closest point of an object as a location of the object (e.g., for relatively long objects, such as bridges, sea walls, etc., that extend in multiple directions from a closest location to the vessel).

In some embodiments, process 400 can estimate a mass of ferromagnetic material (e.g., a mass of iron, an equivalent in mass of iron regardless of whether the object includes iron and/or another ferromagnetic material) included in the object. For example, process 400 can estimate the mass $m_{Fe}$ of iron by multiplying the volume of the object, $V_o$, by the density of iron, $\rho_{Fe}$=7.9 g/cm³ (e.g., $m_{Fe} \approx V_o * d_{Fe}$). In some embodiments, a class of objects can be associated with a value (e.g., (i) that represents a ratio of the volume that is predicted to be ferromagnetic material to the total volume, a value (e.g., $\mu_i$) that represents a ratio of a predicted interference caused by the ferromagnetic material(s) in the object to the predicted interference caused by iron (e.g., some materials can cause greater interference than pure iron, and some materials can cause lesser interference than iron), and/or a value (e.g., $d_i$) that represents a predicted density of the ferromagnetic material in the object. For example, process 400 can estimate a mass of iron in the object based on $\gamma_i$, $V_o$, and $\rho_{Fe}$ (e.g., $m_{Fe} \approx \varphi * V_o * \rho_{Fe}$). As another example, process 400 can estimate an equivalent mass of iron $$(e.g., m_{Fe}^+)$$

in the object based on $\varphi_i$, $\rho_i$, and/or $$\mu_i (e.g., m_{Fe}^+ \approx \mu_i * \varphi_i * V_o * \rho_i).$$

In some embodiments, process 400 can estimate a mass of an object (e.g., a relatively long object and/or a relatively large object, such as a bridge, a seawall, a large dock, etc.) based on a portion of the object that is within range of the magnetometer (e.g., a range described above in connection with 306 of FIG. 3).

In some embodiments, process 400 can estimate a magnitude of a magnetic disturbance (e.g., F) caused by an object(s) in the environment based on the estimated mass, m, of ferromagnetic material in the object $$(e.g., m_{Fe}, m_{Fe}^*)$$

and the distance to the object (e.g., a distance between the magnetometer and the centroid of the object, a distance, d, between the magnetometer and the closes point on the object), using the following relationship:

$$F \approx m/d^2$$

In some embodiments, process 400 can estimate a magnitude of a magnetic disturbance caused by an object(s) in the environment based on a distance to each portion of the object. For example, process 400 can estimate the magnitude of a magnetic disturbance caused by an object(s) using an integral to determine a total contribution of the object(s) to the magnetic disturbance using the following relationship:

$$F = \mu_i(\varphi_i \rho_i) \int_0^\infty \left[ a(r) / r^2 \right] dr$$

where $\varphi_i \rho_i$ is a volumetric density of the object, and a(r) is the area of the surface defined by the intersection of the object with a cylinder of radius $$r \left( e.g., \int_0^\infty a(r) dr \right)$$

is the total volume of the object). Note that although the integral is performed for radius r from 0 to infinity, because magnetic field strength decreases with the inverse square of distance, the total magnetic disturbance can be approximated using an integral over a smaller range of values. Additionally, if there are multiple objects in the environment that have different volumetric densities, a total magnetic disturbance can be determined based on a sum of contributions from multiple objects. Additionally, note that in the example, the integral is performed using a cylinder, but any other suitable shape can be used to determine the total magnetic disturbance.

At 408, process 400 can determine whether an impact estimated at 406 exceeds a threshold. In some embodiments, process 400 can use any suitable technique or combination of techniques, and/or any suitable threshold, to determine whether the impact estimated of the object(s) on the magnetometer is significant (e.g., greater than the threshold). In some embodiments, the threshold can be based on empirical measurements of error in the magnetometer signal in the presence of a ferromagnetic object at various distances. In some embodiments, the threshold can be in a range of values of F that correspond to a threshold heading error (e.g., a magnetometer heading error that significantly impacts control of the marine vessel during closed-loop control). In a more particular example, the threshold can be a value of F that causes an average heading error of 5 degrees, 7.5 degrees, 10 degrees, etc.

If process 400 determines that the impact exceeds the threshold ("YES" at 408), process 400 can move to 410.

At 410, process 400 can reduce reliance on a signal(s) from the magnetometer in calculating a navigational parameter of the vessel (e.g., heading). In some embodiments, process 400 can reduce reliance on the signal from the magnetometer using any suitable technique or combination of techniques, such as techniques describe above in connection with 308 of FIG. 3 and/or techniques described below in connection with 914-926 of FIG. 9 (e.g., removing a contribution of the magnetometer on an estimate of heading, reducing a weight applied to the magnetometer signal in estimating heading, using a secondary disturbance rejection filter).

Otherwise, if process 400 determines that the impact does not exceeds the threshold ("NO" at 408), process 400 can move to 412.

At 412, process 400 can determine one or more navigation parameters using signals from one or more navigation sensors using any suitable technique or combination of techniques, such as techniques described above in connection with 310 of FIG. 3. In some embodiments, reducing reliance on a magnetometer signal(s) in determining heading when process 400 determines that the magnetometer signal may be unreliable can cause a relative increase in reliance on other data (e.g., visual odometery, COG, satellite navigation signals, etc.), which can increase reliability of the heading estimate when the magnetometer data is predicted to be unreliable (e.g., facilitating closed loop control during operations that utilize a heading, such as joystick operation, station keeping, auto-heading, etc.).

At 414, process 400 can present the navigation parameter (s) determined at 412, can use one or more navigation parameters determined at 412 to control one or more propulsion devices, and/or can use one or more navigation parameters determined at 412 to perform any other suitable autonomous control and/or advanced operator assistance control. For example, process 400 can use techniques described above in connection with 312 of FIG. 3 to present and/or use the navigation parameter(s) determined at 412 (e.g., heading).

Figure 5:
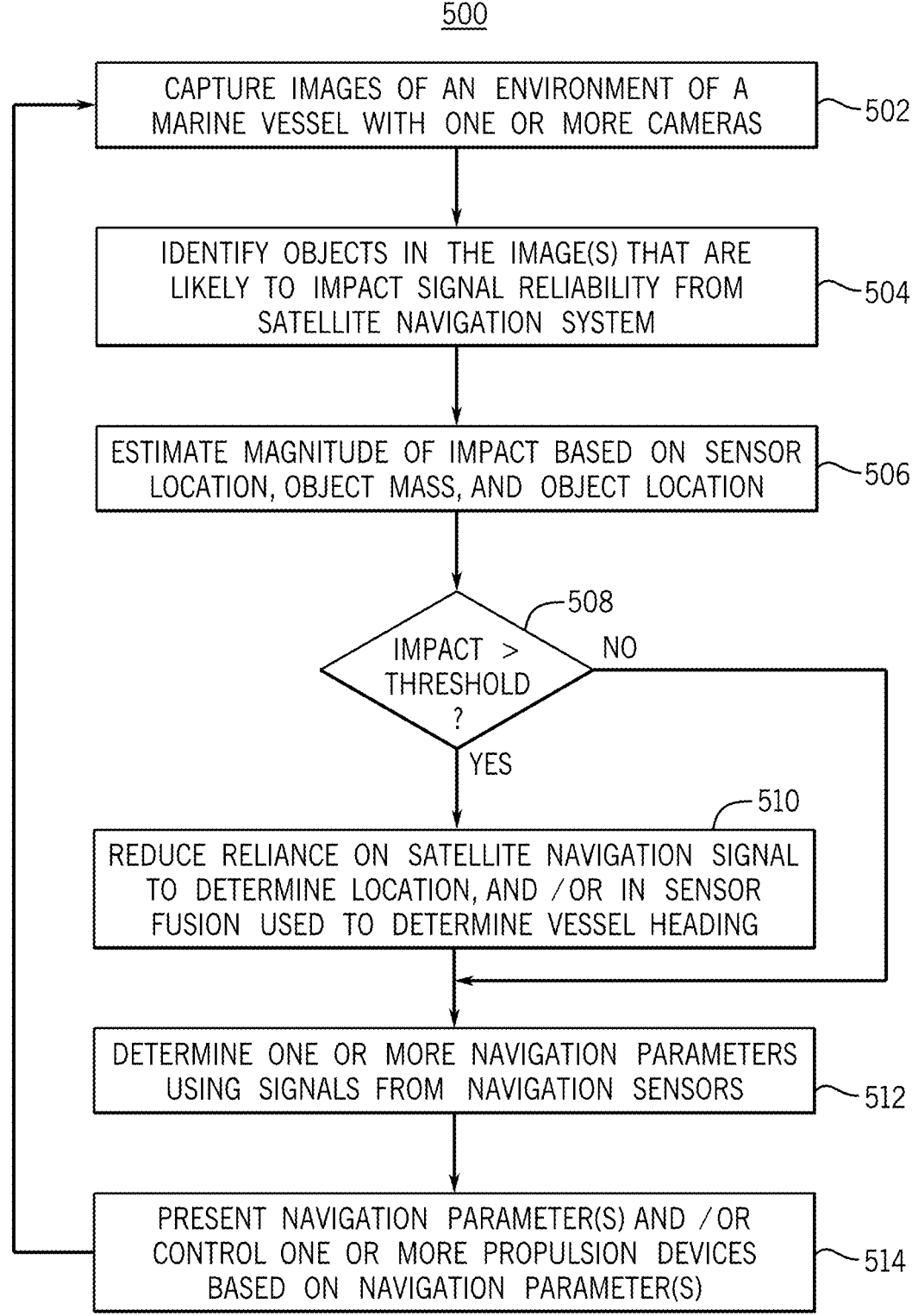
FIG. 5 shows an example of a process for predicting and mitigating location sensor errors using a vision system of a marine vessel in accordance with some embodiments of the disclosure.

FIG. 5 shows an example of a process 500 for predicting and mitigating location sensor errors using a vision system of a marine vessel in accordance with some embodiments of the disclosure.

At 502, process 500 can capture (and/or receive) one or more images of an environment of a marine vessel with one or more cameras, using any suitable technique or combination of techniques, such as techniques described above in connection with 302 of FIG. 3.

At 504, process 500 can identify one or more objects in the image that are likely to degrade reliability of a signal(s) from a satellite navigation receiver, using any suitable technique or combination of techniques. For example, in some embodiments, process 500 can use techniques described above in connection with 304 of FIG. 3.

At 506, process 500 can estimate a magnitude of an impact on the satellite navigation receiver signal based on the sensor location, the object size, and the object location. In some embodiments, process 500 can use 3D location information of one or more portions of an object identified at 504 to estimate the size and/or shape of the object. As described above in connection with FIGS. 1 and 406 of FIG. 4, a vision system of a vessel executing at least a portion of process 500 can generate a 3D model, such as a point cloud, of at least a portion of the environment based on 3D location information determined for portions of an environment (e.g., using stereoscopic cameras). In some embodiments, 3D points in a model (e.g., a point cloud) can be associated with particular objects in the environment that may interfere with satellite navigation sensor signals (e.g., a bridge, a relatively tall building, a relatively tall feature of the landscape such as a bluff, a canyon, etc.) based on a classification of portions of the environment (e.g., via segmentation and/or object detection), based on a height of the object, and/or based on whether the vessel can pass under the object.

In some embodiments, process 500 can estimate a size, shape, and/or height of one or more objects identified at 504 based on a 3D model that includes the object (e.g., a point cloud that includes points associated with the object). For example, process 500 can use one or more techniques described above in connection with 406 of FIG. 4 to estimate a size, shape, and/or height of the object at one or more locations. In a more particular example, process 500 can generate a surface(s) based on the point cloud data associated with the object(s) identified at 504 using any suitable technique or combination of techniques (e.g., using primitives, such as polygons, using a spline surface(s), using a bounding box(s), using a convex hull(s), etc.).

In some embodiments, process 500 can use one or more techniques to predict a shape and/or size of a portion of an object(s) identified at 504 that are outside of a FOV of the vision system (e.g., points that are not included, or not yet included, in a 3D model of the environment), such as techniques described above in connection with 404 of FIG. 4.

In some embodiments, process 500 can determine whether a particular object is likely to impact a satellite navigation sensor signal based on the height of the object (e.g., objects that are no taller than the satellite navigation receiver can be expected not to interfere with satellite navigation sensor signals, objects that the marine vessel can pass under can be expected to interfere with satellite navigation sensor signals). In some embodiments, can determine whether a particular object is likely to impact a satellite navigation sensor signal based on a portion of the sky blocked by the object (e.g., objects that block at least a threshold portion of the sky) and/or portions of the sky blocked by the object (e.g., objects that occupy a space between the satellite navigation receiver and a sufficient number of satellite navigation transmitters to reduce the number of satellite navigation sensor signals below a minimum number). Additionally or alternatively, in some embodiments, process 500 can determine a likely impact on a satellite navigation sensor signal of a particular object based on a classification of the object (e.g., a material(s) in the object based on the classification) as certain materials (e.g., metal, concrete, moist materials, etc.) can be expected to cause more interference with satellite navigation signals than other materials (e.g., thin dry wood, glass, plastic, etc.).

In some embodiments, process 500 can predict that areas of the environment corresponding to objects that exceed a height threshold (and/or, in some examples, that include a material that is likely to interfere with signals from a navigation satellite) have a significant impact on a satellite navigation sensor signal(s) reliability, and areas that do not correspond to objects that exceed a height threshold do not have a significant impact on a satellite navigation sensor signal(s) reliability. Additionally or alternatively, in some embodiments, process 500 can determine that areas of the environment that are likely to have significant multipath interference (e.g., areas that include objects over a minimum height, such as about 4 m, in at least a threshold portion of a predetermined area, such as within a radius of about 15 m).

In some embodiments, process 500 can use information from another source (e.g., an occupancy grid, a chart, a map, a database, etc.) to determine whether a particular location in the environment is likely to be associated with disturbance of a satellite navigation signal(s). In such an example, the alternate data source(s) can include information indicative of a class and/or height of an object in the environment, and process 500 can estimate the shape and/or size of an area(s) of the environment likely to be associated with significant disturbance of a satellite navigation signal(s).

At 508, process 500 can determine whether an impact estimated at 506 exceeds a threshold. In some embodiments, process 500 can use any suitable technique or combination of techniques, to determine whether an object(s) is likely to significantly interfere with the satellite navigation receiver. For example, in some embodiments, process 500 can determine that the impact of an object(s) on the satellite navigation receiver signal is over a threshold if a location of the satellite navigation receiver overlaps with an area occupied by an object over a height threshold. Additionally or alternatively, in some embodiments, process 500 can determine that the impact of an object(s) on the satellite navigation receiver signal is over a threshold if a location of the satellite navigation receiver overlaps with an area predicted to experience significant multipath interference.

In some embodiments, process 500 can omit 504 and 506, and can determine whether a calculated magnitude of an impact on the satellite navigation receiver signal exceeds a threshold. For example, process 500 can determine whether a sufficient number of satellite navigation signals are being received with sufficient received signal strength (e.g., if the number of signals falls below a threshold, it may not be possible to determine an accurate location of the satellite navigation receiver), and process 500 can determine that an impact on the satellite navigation receiver signal exceeds a threshold. As another example, if the accuracy of a location output by the satellite navigation receiver falls below a threshold, process 500 can determine that an impact on the satellite navigation receiver signal exceeds a threshold.

If process 500 determines that the impact exceeds the threshold ("YES" at 508), process 500 can move to 510.

At 510, process 500 can reduce reliance on a signal(s) from the satellite navigation receiver in calculating a navigational parameter of the vessel (e.g., a heading of the vessel, a location of the vessel, a speed of the vessel, a COG). In some embodiments, process 500 can reduce reliance on the signal from the satellite navigation receiver (s) using any suitable technique or combination of techniques, such as techniques describe above in connection with 308 of FIG. 3 and/or techniques described below in connection with 914-926 of FIG. 9 (e.g., removing a contribution of the satellite navigation receiver signal(s) on an estimate of a navigation parameter, reducing a weight applied to the signal, using a secondary disturbance rejection filter).

Otherwise, if process 500 determines that the impact does not exceed the threshold ("NO" at 508), process 500 can move to 512.

At 512, process 500 can determine one or more navigation parameters using signals from one or more navigation sensors using any suitable technique or combination of techniques, such as techniques described above in connection with 310 of FIG. 3. In some embodiments, reducing reliance on a satellite navigation receiver signal(s) in determining a navigation parameter(s) when process 500 determines that the satellite navigation receiver signal(s) may be unreliable can cause a relative increase in reliance on other data (e.g., visual odometery, speed over ground, magnetometer, etc.), which can increase reliability of the estimated navigation parameter(s) when the satellite data is predicted to be unreliable (e.g., facilitating closed loop control during operations that utilize a location, such as autonomous navigation, station keeping, auto-heading, etc.).

At 514, process 500 can present the navigation parameter (s) determined at 512, can use one or more navigation parameters determined at 512 to control one or more propulsion devices, and/or can use one or more navigation parameters determined at 512 to perform any other suitable autonomous control and/or advanced operator assistance control. For example, process 500 can use techniques described above in connection with 312 of FIG. 3 to present and/or use the navigation parameter(s) determined at 512.

Figure 6:
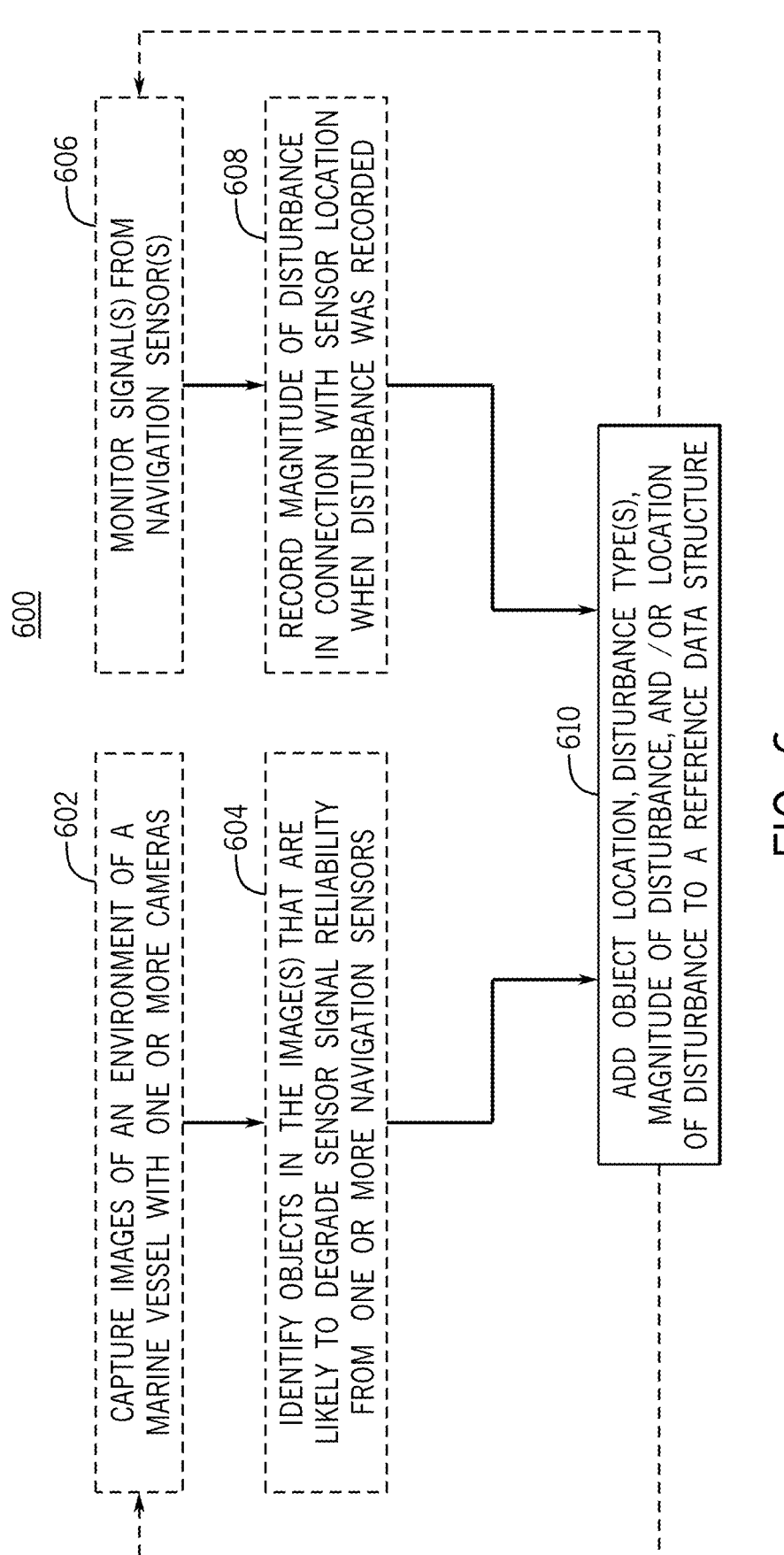
FIG. 6 shows an example of a process for adding navigation disturbance information to a data structure in accordance with some embodiments of the disclosure.

FIG. 6 shows an example of a process 600 for adding navigation disturbance information to a data structure in accordance with some embodiments of the disclosure. In some embodiments, mechanisms described herein can generate and/or update a data structure (e.g., a database, a map database, a list, etc.) with information about objects and/or locations associated with disturbance of one or more navigation sensor signals (e.g., magnetometer signals, satellite navigation sensors, etc.), a magnitude of a disturbance, and/or a direction of a disturbance. In some embodiments, process 600 can be used to generate and/or update such information during normal operation of a vessel (e.g., during navigation of the vessel between locations) and/or during operation to collect data (e.g., following a particular route to generate nautical map data). In some embodiments, process 600 can use a vision system of a vessel to identify objects that are likely to degrade reliability of one or more navigation sensors (e.g., as described above in connection with FIGS. 3-5), and can cause information associated with the object (e.g., location information, size and/or shape, height, mass, type of disturbance, etc.) to be included in a data structure.

Additionally or alternatively, in some embodiments, process 600 can monitor signals from one or more navigation signals, and can compare estimates of one or more navigation parameters (e.g., heading, location, course, speed, course over ground, etc.) determined based on different navigation signals (e.g., magnetometer signals, visual odometry, satellite navigation, etc.) to determine a magnitude and/or direction of a disturbance associated with a portion of the environment. Note that, in some examples, information about a location and/or magnitude of certain disturbances can be collected using a vessel that does not include a vision system. For example, as described below, in some embodiments, a vessel that is configured with multiple satellite navigation receivers (e.g., a dual-GNSS system) can compare a heading based on signals from the satellite navigation receivers to a heading based on signals from a magnetometer (e.g., a reference magnetometer similar to a magnetometer that is likely to be included in a vessel, such as vessel 10).

At 602, process 600 can capture (and/or receive) one or more images of an environment of a marine vessel with one or more cameras, using any suitable technique or combination of techniques, such as techniques described above in connection with 302 of FIG. 3.

At 604, process 600 can identify one or more objects in the image that are likely to degrade reliability of a signal(s) from one or more navigation sensors using any suitable technique or combination of techniques. For example, in some embodiments, process 600 can use techniques described above in connection with 304 of FIG. 3.

In some embodiments, estimated properties of an object can be determined at 604 (e.g., a shape and/or size, volume, location, centroid, height, mass, mass of iron, etc.) using techniques described above in connection with 406 of FIG. 4, and 506 of FIG. 5.

In some embodiments, 602 and/or 604 can be omitted. For example, a vessel may not include a vision system and/or processing system configured to identify objects in the environment that are likely to degrade reliability of a signal (s) from one or more navigation sensors. In a particular example, a vessel executing process 600 can be configured to empirically measure a disturbance of one or more navigation sensors (e.g., as described below in connection with 606 and 608), and may not collect and/or utilize visual data as described above in connection with 602 and 604.

At 606, process 600 can monitor a signal(s) from various navigation sensors (e.g., a magnetometer, one or more navigation satellite receivers, visual odometry, etc.). In some embodiments, process 600 can monitor cany suitable navigation sensors, and can use signals from the navigation sensor(s) to estimate any suitable navigation parameters (e.g., heading, location, course, speed, course over ground, etc.). In some embodiments, a vessel executing process 600 can be equipped with one or more highly accurate and/or reliable navigation sensors, such as a dual-GNSS satellite navigation system (e.g., including multiple receivers spaced a predetermined distance apart) that is configured to determine a position and/or heading of the vessel with relatively high accuracy (e.g., configured to determine a heading with sub-degree accuracy with receivers 1+m apart), and/or other navigation sensors capable of determining heading with high accuracy (e.g., a device that uses a non-magnetic sensor, such as a gyrocompass). Additionally or alternatively, in some embodiments, a vessel executing process 600 can be equipped with a vision system that can be used to determine one or more navigation parameters (e.g., heading, location, speed, course, course over ground, etc.) based on visual odometry. As yet another example, a vessel executing process 600 can be equipped with a magnetometer that can be used to determine one or more navigation parameters (e.g., heading).

At 608, process 600 can record a magnitude of a disturbance in connection with a sensor location when the disturbance was recorded based on a comparison of navigation parameters generated using different source(s) of navigation signals. In some embodiments, process 600 can use a navigation sensor signal that is likely to be reliable (e.g., a dual-GNSS signal, a visual odometery signal when sufficient objects in the environment can be tracked, etc.) as a comparison to a sensor signal that may not be reliable (e.g., a magnetometer signal). At 608, process 600 can determine a magnitude of an error in a navigation signal (e.g., heading) based on the comparison between a reliable navigation parameter (e.g., heading based on dual-GNSS signals) and a potentially less reliable estimate of the same navigation parameter (e.g., heading based on signals from a magnetometer). In some embodiments, process 600 can record a magnitude of the error in the navigation parameter estimated using the less reliable data. As described below in connection with 610, a magnitude of error can be associated with locations in a data structure (e.g., a database, a map database, a navigational chart, etc.), and such information can be used by a vessel to determine whether a particular signal (e.g., a signal from a magnetometer) is likely to be reliable.

Additionally or alternatively, in some embodiments, process 600 can determine a direction of an error in a navigation signal (e.g., heading) based on the comparison between a reliable navigation parameter (e.g., heading based on dual-GNSS signals) and a potentially less reliable estimate of the same navigation parameter (e.g., heading based on signals from a magnetometer). In some embodiments, process 600 can record a direction of the error in the navigation parameter estimated using the less reliable data. As described below in connection with 610, a direction of error can be associated with locations in a data structure (e.g., a database, a map database, a navigational chart, etc.), and such information can be used by a vessel to determine whether a particular signal (e.g., a signal from a magnetometer) is likely to be reliable and/or to adjust an unreliable signal (e.g., to adjust a heading based on a signal from the magnetometer).

Additionally or alternatively, at 608, process 600 can record a value(s) indicative a disturbance in connection with a sensor location when the disturbance was recorded based on one or more metrics generated by the navigation sensor. For example, process 600 can record a value indicative of a number of satellite transmitters that are visible (e.g., from which a signal can be received), a signal strength of a signal from each visible satellite transmitter, etc.

In some embodiments, 606 and/or 608 can be omitted. For example, a vessel may not be configured to accurately determine an error in a navigation parameter (e.g., if a disturbance object is located relatively far away and does not impact the measured navigation parameter, if the vessel is not capable of generating a reliable navigation parameter for comparison, etc.).

At 610, process 600 can add an object location, a disturbance location, a disturbance type (e.g., associated with the object and/or disturbance location), a magnitude of the disturbance, and/or a direction(s) of the disturbance to a reference data structure. In some embodiments, any suitable information can be added to the data structure, such as a location at which a disturbance was measured (e.g., at 606), a location of an object (e.g., determined at 604), a size and/or shape of an object, an estimated impact (e.g., as described above in connection with 406 of FIGS. 4 and/or 506 of FIG. 5), a measured magnitude of a disturbance, a measured direction of a disturbance, a type of disturbance (e.g., magnetic, navigation satellite signal), etc. In some embodiments, if the disturbance is attributed to a non-static object (e.g., a barge, a large shipping vessel, etc.), information about the disturbance can be excluded from the data structure, and/or can be labeled as potentially transient.

In some embodiments, process 600 can add the information about a disturbance to any suitable data structure, which can be stored via any suitable computing device. For example, in some embodiments, process 600 can add information about a disturbance to a list, a database, a map database, etc. As another example, the data structure can be stored and maintained locally (e.g., via a processor of the vessel, such as controller 24, processor 224, or another processor, such as a processor of a laptop computer, a smartphone, a tablet, etc.). Additionally or alternatively, in some embodiments, a data structure (which can be a version of a data structure that is maintained locally, or a different data structure which can be a different type of data structure and/or can include contributions from other source, such as other vessels executing process 600) can be stored and maintained remotely (via a server, such as server 240).

In some embodiments, a centrally maintained data structure (e.g., maintained by a server, such as server 240) can be used to update local data structures (e.g., as communication between vessel 10 and server 240 may be unreliable in some locations). Additionally or alternatively, in some embodiments, information from different sources can be combined using any suitable technique or combination of techniques, and/or can be selected using any suitable technique or combination of techniques. For example, in some embodiments, information about a disturbance object and/or disturbance submitted by a particular device executing process 600 can be added to the data structure if a minimum number of corresponding disturbances have been submitted from other sources. As another example, information about a disturbance object and/or disturbance submitted by multiple sources can be aggregated (e.g., using an average, a weighted average based on predicted reliability of the information, etc.).

Figure 7:
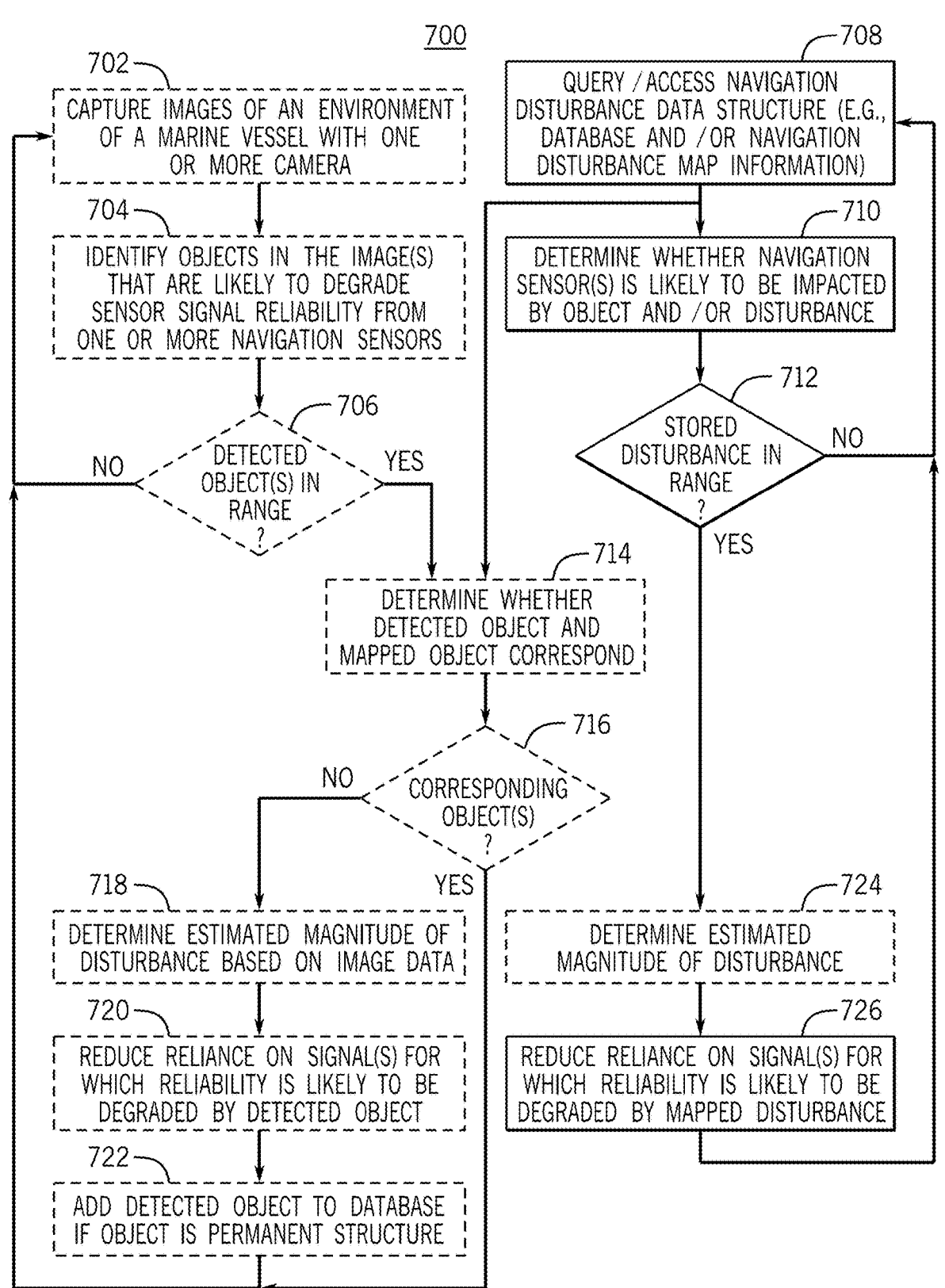
FIG. 7 shows an example of a process for using a data structure that includes navigation disturbance information to predict and mitigate sensor errors of a marine vessel in accordance with some embodiments of the disclosure.

FIG. 7 shows an example of a process 700 for using a data structure that includes navigation disturbance information to predict and mitigate sensor errors of a marine vessel in accordance with some embodiments of the disclosure.

At 702, process 700 can capture (and/or receive) one or more images of an environment of a marine vessel with one or more cameras, using any suitable technique or combination of techniques, such as techniques described above in connection with 302 of FIG. 3.

At 704, process 700 can identify one or more objects in the image(s) that are likely to degrade reliability of a signal(s) from a navigation sensor using any suitable technique or combination of techniques. For example, in some embodiments, process 700 can use techniques described above in connection with 304 of FIG. 3.

In some embodiments, estimated properties of an object can be determined at 704 (e.g., a shape and/or size, volume, location, centroid, height, mass, mass of iron, etc.) using techniques described above in connection with 406 of FIG. 4, and 506 of FIG. 5.

At 706, process 700 can determine whether an object in the image is in a location that is likely to impact the navigation sensor(s). In some embodiments, process 700 can use techniques described above in connection with 306 of FIG. 3, in connection with process 400 of FIG. 4, and/or in connection with process 500 of FIG. 5.

If process 700 determines that no object(s) are within range to impact the navigation sensor(s) ("NO" at 706), process 700 can return to 702.

Otherwise, if process 700 determines that an object(s) are within range to impact the navigation sensor(s) ("YES" at 706), process 700 can move to 714.

At 708, process 700 can query and/or access a navigation disturbance data structure (e.g., a database and/or navigation disturbance map information) based on a current location, course, course over ground, and/or heading of a marine vessel. In some embodiments, the data structure can be stored locally and/or remotely (e.g., in memory 232 or another memory associated with vessel 10, and/or in memory 252 of server 240).

In some embodiments, process 700 can receive any suitable disturbance information store in the data structure, such as information stored at 610 of FIG. 6, information determined at 304 of FIG. 3, 406 of FIG. 4, and/or 506 of FIG. 5.

At 710, process 700 can determine whether a navigation sensor(s) is likely to be impacted by an object and/or disturbance accessed at 708. In some embodiments, process 700 can use any suitable technique or combination of techniques to determine whether a navigation sensor(s) is likely to be impacted by an object and/or disturbance accessed at 708. For example, process 700 can determine whether an estimated impact is greater than a threshold (e.g., as described above in connection with 408 of FIGS. 4 and/or 508 of FIG. 5) based on a location and/or mass associated with an object(s) in the environment. As another example, process 700 can determine whether a magnitude of a disturbance associated with the current location (e.g., a magnetic disturbance, a disturbance in navigation satellite signals, etc.) is greater than a threshold.

At 712, process 700 can determine whether a stored disturbance is likely to impact the navigation sensor(s). In some embodiments, if none of the disturbances accessed at 708 are determined to be individually likely to impact a navigation sensor (e.g., at 710), and/or an aggregation of disturbances accessed at 708 are not likely to impact a navigation sensor, process 700 can determine that the disturbance(s) accessed at 708 are not within a range to impact the navigation sensor(s) of the vessel. Otherwise, if at least one of the disturbances accessed at 708 is determined to be individually likely to impact a navigation sensor, and/or an aggregation of disturbances accessed at 708 are likely to collectively impact a navigation sensor, process 700 can determine that the disturbance(s) accessed at 708 is within a range to impact the navigation sensor(s) of the vessel.

If process 700 determines that no stored disturbance(s) is within range to impact the navigation sensor(s) ("NO" at 712), process 700 can return to 708.

Otherwise, if process 700 determines that a stored disturbance(s) is within range to impact the navigation sensor(s) ("YES" at 712), process 700 can move to 724.

At 714, process 700 can determine whether an object(s) identified in the environment is likely to correspond to an object that is already included in the stored disturbance information accessed at 708. In some embodiments, process 700 can use any suitable technique or combination of techniques to determine whether an object identified at 704 corresponds to a disturbance accessed at 708. For example, process 700 can determine that the object corresponds to an object and/or disturbance in the data structure if the objects overlap (e.g., based on a location of a centroid and a size/shape of the object from each source). As another example, process 700 can determine that the object corresponds to an object and/or disturbance in the data structure if the objects are classified as the same type of object.

If process 700 determines that an object identified at 704 correspond to an object or disturbance in the stored disturbance information ("NO" at 716), process 700 can move to 718.

Otherwise, if process 700 determines that at least one object corresponds to an object or disturbance in the stored disturbance information ("YES" at 716), process 700 can return to 702.

At 718, process 700 can determine an estimated magnitude of the disturbance based on the image data using any suitable technique or combination of techniques, such as techniques described above in connection with process 400 of FIGS. 4 and/or 500 of FIG. 4.

At 720, process 700 can reduce reliance on a signal(s) from the impacted navigation sensor(s), if the impact is likely to be greater than a threshold. In some embodiments, process 700 can reduce reliance on the signal from the satellite navigation receiver(s) using any suitable technique or combination of techniques, such as techniques describe above in connection with 308 of FIG. 3, 410 of FIG. 4, 510 of FIG. 5, and/or techniques described below in connection with 914-926 of FIG. 9 (e.g., removing a contribution of the satellite navigation receiver signal(s) on an estimate of a navigation parameter, reducing a weight applied to the signal, using a secondary disturbance rejection filter).

At 722, process 700 can add the identified object(s) to the database/map if the object is a permanent object using any suitable technique or combination of techniques, such as techniques described above in connection with 610 of FIG. 6. In some embodiments, if the object is likely a transient object (e.g., a moving object, a vessel, etc.), process 700 can omit adding the object to the data structure, and/or can label the object as being potentially transient (e.g., to be removed if not detected by subsequent vessels).

At 724, process 700 can determine an estimated magnitude of a disturbance based on the stored disturbance information, and any other suitable information (e.g., vessel location, etc.) using any suitable technique or combination of techniques, such as techniques described above in connection with process 400 of FIG. 4 and/or process 500 of FIG. 5.

In some embodiments, 724 can be omitted. For example, if an estimated impact was already determined (e.g., at 710) or if a magnitude of disturbance is received for the location (e.g., at 708 based on measurements at 606).

At 726, process 700 can reduce reliance on a signal(s) from the impacted navigation sensor(s), if the impact is likely to be greater than a threshold. In some embodiments, process 700 can reduce reliance on the signal from the satellite navigation receiver(s) using any suitable technique or combination of techniques, such as techniques describe above in connection with 308 of FIG. 3 and/or techniques described below in connection with 914-926 of FIG. 9 (e.g., removing a contribution of the satellite navigation receiver signal(s) on an estimate of a navigation parameter, reducing a weight applied to the signal, using a secondary disturbance rejection filter).

Additionally or alternatively, in some embodiments, a disturbance of a navigation signal can be measured and compared to the estimated impact (e.g., estimated at 724 and/or 710) and/or can be compared to a more reliable navigation signal (e.g., based on visual odometry, a dual-GNSS system, etc.). In some embodiments, such a measurement can be used to update and/or correct a value(s) (e.g., magnitude and/or direction) stored in the data structure.

In some embodiments, process 700 can exclude 702-706, and 714-724, for example, if information from the data structure is used to reduce a reliance on one or more navigation sensors without utilizing a vision system (e.g., if the vessel does not include a vision system).

Figure 8:
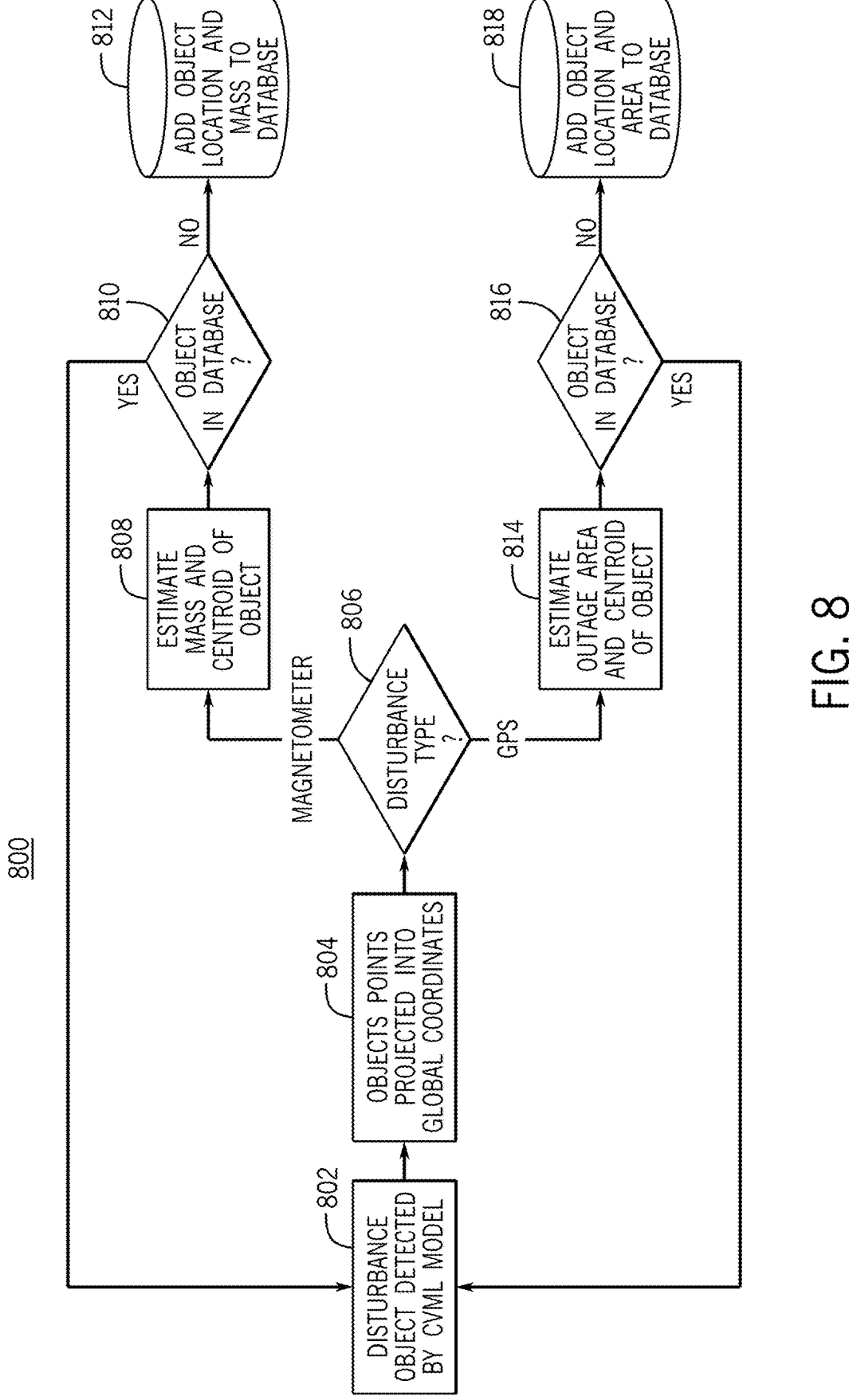
FIG. 8 shows an example of a process for updating navigation disturbance information in a data structure in accordance with some embodiments of the disclosure.

FIG. 8 shows an example of a process 800 for updating navigation disturbance information in a data structure in accordance with some embodiments of the disclosure.

At 802, process 800 can detect a disturbance object using a machine learning model using any suitable technique or combination of techniques, such as techniques described above in in connection with 304 of FIG. 3.

At 804, process 800 can project object points of the detected object into a global coordinate system using any suitable technique or combination of techniques, such as techniques described above in connection with FIG. 1, 406 of FIG. 4, and/or 506 of FIG. 5.

At 806, process 800 can determine whether the disturbance object is likely to cause a magnetic disturbance ("Magnetometer"), a satellite navigation receiver disturbance ("GPS"), or both. In some embodiments, process 800 can determine whether the disturbance is likely to impact a magnetometer and/or a satellite navigation receiver using any suitable technique or combination of techniques, such as techniques described above in connection with 304 of FIG. 3, 404 of FIG. 4, and/or 504 of FIG. 5.

If process 800 determines that the disturbance object is likely to cause a magnetic disturbance ("Magnetometer"), process 800 can move to 810.

If process 800 determines that the disturbance object is likely to cause a satellite navigation disturbance ("GPS"), process 800 can move to 814. Note that an object can impact both a magnetometer signal and a satellite navigation signal (e.g., a metal bridge).

At 808, process 800 can estimate an impact of magnetic disturbance using any suitable technique or combination of techniques, such as techniques described above in connection with 304 of FIG. 3, and/or 406 of FIG. 4.

At 810, process 800 can determine whether the object is in a database (or other data structure) of stored disturbances using any suitable technique or combination of techniques, such as techniques described above in connection with process 700 of FIG. 7.

If the object is in the database ("YES" at 810), process 800 can return to 802, and/or can mark the object as a duplicate (e.g., such that if the object is detected again at 802, process 800 can ignore the object).

Otherwise, if the object is not in the database ("NO" at 810), process 800 can move to 812, and can add the object to the database using any suitable technique or combination of techniques, such as techniques described above in connection with 610 of FIGS. 6 and/or 722 of FIG. 7.

At 814, process 800 can estimate an impact of a satellite navigation disturbance using any suitable technique or combination of techniques, such as techniques described above in connection with 304 of FIG. 3, and/or 506 of FIG. 5.

At 816, process 800 can determine whether the object is in a database (or other data structure) of stored disturbances using any suitable technique or combination of techniques, such as techniques described above in connection with process 700 of FIG. 7.

If the object is in the database ("YES" at 816), process 800 can return to 802, and/or can mark the object as a duplicate (e.g., such that if the object is detected again at 802, process 800 can ignore the object).

Otherwise, if the object is not in the database ("NO" at 816), process 800 can move to 818, and can add the object to the database using any suitable technique or combination of techniques, such as techniques described above in connection with 610 of FIGS. 6 and/or 722 of FIG. 7.

Figure 9:
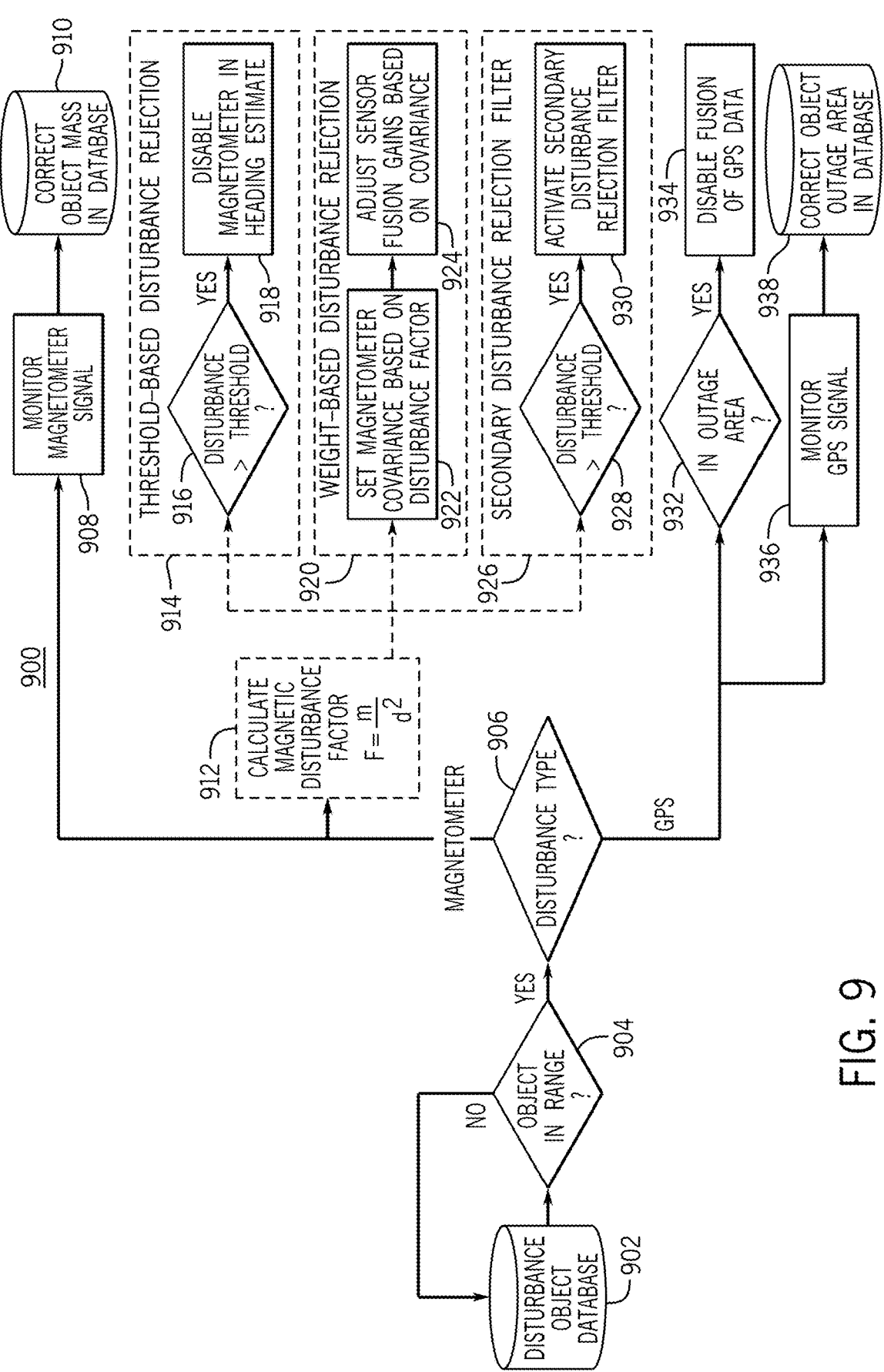
FIG. 9 shows another example of a process for using a data structure that includes navigation disturbance information to predict and mitigate sensor errors of a marine vessel in accordance with some embodiments of the disclosure.

FIG. 9 shows another example of a process 900 for using a data structure that includes navigation disturbance information to predict and mitigate sensor errors of a marine vessel in accordance with some embodiments of the disclosure.

At 902, process 900 can access information from a data structure of stored navigation disturbance information using any suitable technique or combination of techniques such as techniques described above in connection with 708 of FIG. 7.

At 904, process 900 can determine whether a disturbance from the data structure is within range of a navigation sensor that is likely to be impacted by the disturbance received from the data structure using any suitable technique or combination of techniques, such as techniques described above in connection with 304 of FIG. 3, 406 of FIG. 4, 506 of FIG. 5, and/or 710 and 712 of FIG. 7.

If process 900 determines that a disturbance is within range ("YES" at 904), process 900 can move to 906. Otherwise, if process 900 determines that a disturbance is not within range ("NO" at 904), process 900 can return to 902.

At 906, process 900 can determine whether the disturbance is likely to cause a magnetic disturbance ("Magnetometer"), a satellite navigation receiver disturbance ("GPS"), or both. In some embodiments, process 800 can determine whether the disturbance is likely to impact a magnetometer and/or a satellite navigation receiver using any suitable technique or combination of techniques, such as techniques described above in connection with 304 of FIG. 3, 404 of FIG. 4, and/or 504 of FIG. 5.

If process 900 determines that the disturbance object is likely to cause a magnetic disturbance ("Magnetometer"), process 900 can move to 908 and/or 912.

If process 900 determines that the disturbance object is likely to cause a satellite navigation disturbance ("GPS"), process 900 can move to 932 and/or 936. Note that an object can impact both a magnetometer signal and a satellite navigation signal (e.g., a metal bridge).

At 908, process 900 can monitor a magnetometer signal as the magnetometer of the vessel moves in a vicinity of the magnetic disturbance object (e.g., and record an error in the signal based on the heading of the vessel and the heading based on the magnetometer signal) using any suitable technique or combination of techniques, such as techniques described above in connection with process 600 of FIG. 6, and/or process 700 of FIG. 7.

At 910, process 900 can correct and/or update disturbance information in the data structure of stored navigation disturbance information based on the measured error of the magnetometer using any suitable technique or combination of techniques, such as techniques described above in connection with process 600 of FIG. 6, and/or process 700 of FIG. 7.

At 912, process 900 can estimate an impact of the magnetic disturbance on the magnetometer signal using any suitable technique or combination of techniques, such as techniques described above in connection with process 400 of FIG. 4, process 500 of FIG. 5, and/or process 700 of FIG. 7. Note that, in some embodiments, 912 can be omitted, for example, if an estimated impact was already determined (e.g., at 904) or if a magnitude of disturbance is received for the location (e.g., at 902 based on measurements at 606).

At 914, 920, or 926, process 900 can reduce reliance on a signal(s) from the magnetometer in calculating a navigational parameter of the vessel (e.g., heading).

For example, at 914, process 900 can exclude the magnetometer data from a heading estimate at 918, if process 900 determines, at 916, that the impact (e.g., estimated at 912 or received at 902) exceeds a threshold. In some embodiments, process 900 can exclude the magnetometer data from the heading estimate at 918 using any suitable technique or combination of techniques. In a more particular example, process 900 can increase a covariance associated with the magnetometer data in a Kalman filter to a very high value (e.g., including infinite), which can cause the magnetometer data to be excluded from a heading estimate output from the Kalman filter. As another more particular example, process 900 can inhibit the magnetometer data from being provided to a model used to estimate a heading of the vessel. In another more particular example, process 900 can decrease a filter gain associated with the magnetometer data in a complementary filter to a very low value (e.g., including gains below −10 dB), which can cause the magnetometer data to be excluded from a heading estimate output from the complementary filter. As another more particular example, process 900 can inhibit the magnetometer data from being provided to a model used to estimate a heading of the vessel.

As another example, at 920, process 900 can adjust a covariance (or filter gain for a complementary filter) for the magnetometer signal based on the impact (e.g., estimated at 912 or received at 902), and at 924, can adjust sensor fusion gains used to calculate a heading estimate based on the adjusted covariance (or other suitable weight). In some embodiments, process 900 can reduce a contribution of the magnetometer data to a heading estimate at 924 using any suitable technique or combination of techniques. In a more particular example, process 900 can increase a covariance associated with the magnetometer data in a Kalman filter to a higher value (e.g., as described below in connection with FIG. 11), which can cause the heading estimate output from the Kalman filter to be influenced less by the magnetometer data, and more by one or more other sources of data that can be used to estimate a heading (e.g., visual odometry, COG, satellite navigation data, etc.). As another more particular example, process 900 can adjust any suitable weight used to control a contribution of a particular signal (e.g., a magnetometer signal) to a heading estimate. In some embodiments, a change in the covariance (or other weight) can vary based on an estimated disturbance caused by the object(s).

As yet another example, at 926, process 900 can activate a disturbance rejection filter (or other suitable technique) at 930, if process 900 determines, at 928, that the impact (e.g., estimated at 912 or received at 902) exceeds a threshold. In some embodiments, process 900 can activate any suitable disturbance rejection filter at 930 using any suitable technique or combination of techniques. In a more particular example, techniques described in U.S. Provisional Patent Application No. 63/497,598, filed Apr. 21, 2023, which is hereby incorporated by reference herein in its entirety. As another more particular example, techniques described in Wang et al., "External Disturbances Rejection for Vector Field Sensors in Attitude and Heading Reference Systems," Micromachines, 11(9), 803 (2020); Lee et al., "Compensated Heading Angles for Outdoor Mobile Robots in Magnetically Disturbed Environment" IEEE Transactions on Industrial Electronics, 66(6) (2018); and Gu et al., "A Fault-Tolerant Multiple Sensor Fusion Approach Applied to UAV Attitude Estimation," International Journal of Aerospace Engineering, Vol. 2016 (2016), each of which is hereby incorporated by reference herein in its entirety.

At 932, process 900 can determine whether the satellite navigation receiver is within an outage area (e.g., based on an outage area associated with the disturbance information received at 902).

If process 900 determines that the satellite navigation receiver is within an outage area ("YES" at 932), process 900 can move to 934, and can reduce reliance on a signal(s) from the satellite navigation receiver in calculating a navigational parameter of the vessel (e.g., a location of the marine vessel, a heading of the marine vessel, a course of the marine vessel, a location of the vessel, a speed of the vessel, a COG, etc.). In some embodiments, any suitable technique or combination of techniques can be used to reduce reliance on a signal(s) from the satellite navigation receiver(s), such as techniques described above in connection with 510 of FIG. 5, and 914-930 in the context of magnetometer data.

Otherwise, if process 900 determines that the satellite navigation receiver is not within an outage area ("NO" at 932), process 900 can continue monitoring a location of the satellite navigation receiver (e.g., can return to 932 and/or 308), and can continue to use a signal(s) from the satellite navigation receiver in calculating a navigational parameter of the vessel (e.g., a location of the marine vessel, a heading of the marine vessel, a course of the marine vessel, a location of the vessel, a speed of the vessel, a COG, etc.).

At 936, process 900 can monitor a satellite navigation signal as the satellite navigation receiver of the vessel moves in a vicinity of the disturbance object (e.g., and record an error in the signal based on the estimated location of the vessel and the location based on the satellite navigation signal) using any suitable technique or combination of techniques, such as techniques described above in connection with process 600 of FIG. 6, and/or process 700 of FIG. 7.

At 938, process 900 can correct and/or update disturbance information in the data structure of stored navigation disturbance information based on the measured error of the satellite navigation receiver using any suitable technique or combination of techniques, such as techniques described above in connection with process 600 of FIG. 6, and/or process 700 of FIG. 7.

FIG. 10 shows an example of an image and segmentation information generated based on the image, which can be used in predicting and mitigating sensor errors using a vision system of a marine vessel in accordance with some embodiments of the disclosure. The left panel 1002 of FIG. 10 shows a color image captured by an image sensor of a depth camera, such as a color image sensor of a stereoscopic camera (e.g., as described above in connection with sensors 72-78 of FIG. 1 and sensor device 202 of FIG. 2). The right panel 1004 shows segmentation information generated by a trained machine learning model from the color image on the left. As shown in FIG. 10, the segmentation information specifies a class for each portion (e.g., each pixel) of the color image. As described above, in some embodiments, the segmentation information can include a set of masks, with each mask corresponding to a particular class of feature. In some embodiments, depth information from a depth sensor (e.g., a stereoscopic camera that generated the color image) can be associated with the segmentation information. This can facilitate labeling of points in a depth map or point cloud generated from the depth information produced by the depth sensor as being associated with particular types of objects. Such information can be used to assist in autonomous navigation, and can also be used to identify objects that may cause interference with one or more navigation sensors using mechanisms described herein. For example, using the label information from the segmentation information to identify points corresponding to particular features can facilitate associating points that can be expected to represent the same point of a physical object. Using the correspondence, mechanisms described herein can identify objects in the environment that include ferromagnetic material and/or that can block and/or reflect a satellite navigation signal.

Figure 11:
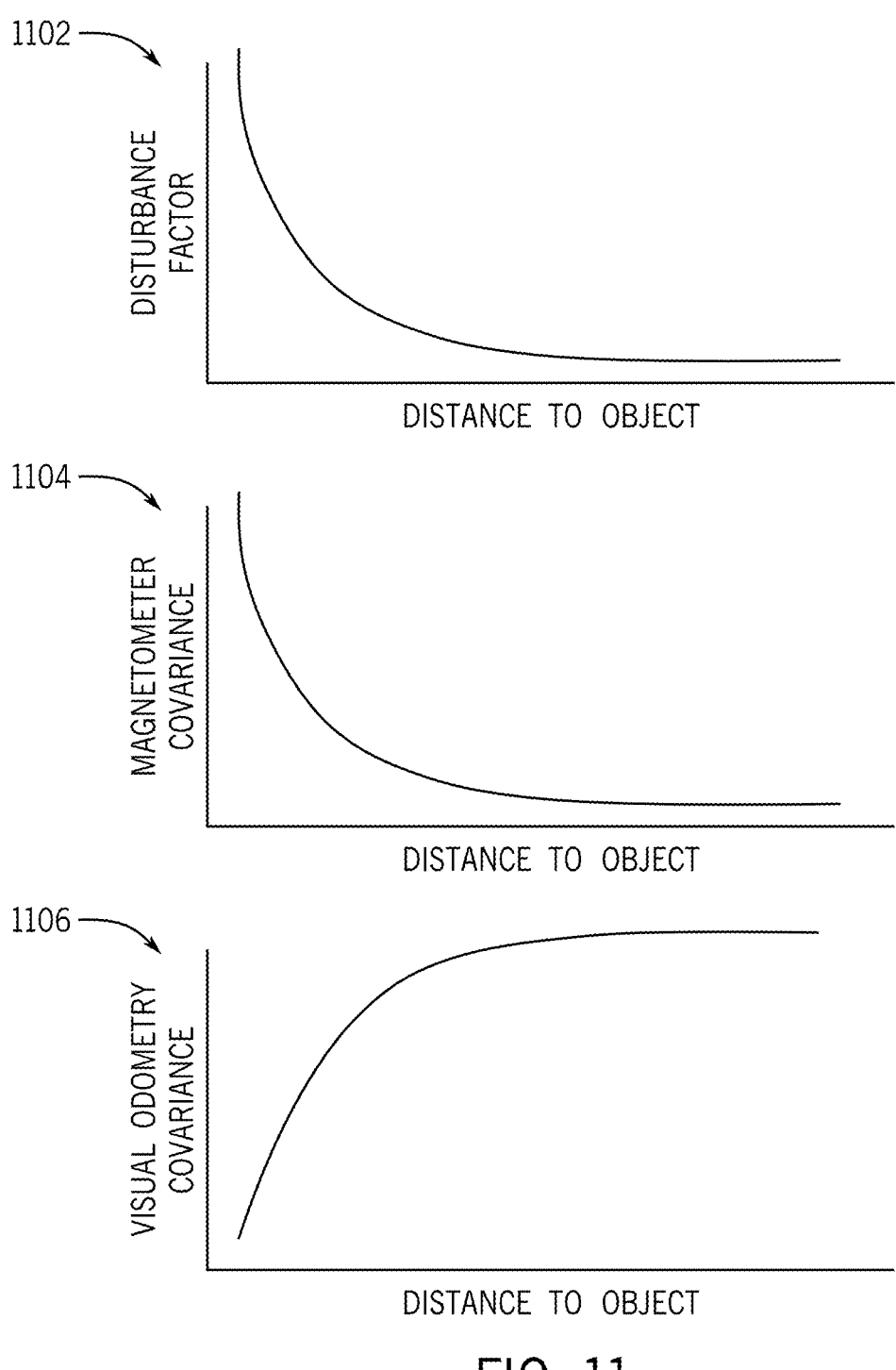
FIG. 11 shows an example of a relationship between a distance to an object, a disturbance caused by the object, and covariance values associated with different navigation signals that can be used in predicting and mitigating sensor errors using a vision system of a marine vessel in accordance with some embodiments of the disclosure.

FIG. 11 shows an example of a relationship between a distance to an object, a disturbance caused by the object, and covariance values associated with different navigation signals that can be used in predicting and mitigating sensor errors using a vision system of a marine vessel in accordance with some embodiments of the disclosure. The example of FIG. 11 is related to a disturbance object in the environment that causes magnetic interference. As shown in FIG. 11, a magnitude of the disturbance caused by the object ("Disturbance Factor" in 1102) can be relatively high when the magnetometer is relatively close to the object, and can drop off rapidly as the distance between the object and the magnetometer increases. As described above (e.g., in connection with FIG. 9) and as shown in 1104, a covariance associated with a magnetometer signal can be adjusted to be larger when the disturbance caused by the object is larger, which can cause the contribution of the magnetometer signal to calculation of heading to decrease (e.g., as the magnetometer data is less reliable). In some embodiments, a covariance associated with another navigation sensor (e.g., visual odometry derived from a vision system) can be lower when the object is near, as shown in 1106, which can cause the contribution of the visual odometry signal to calculation of heading to increase (e.g., as visual odometry signal is likely to be more reliable when an object is close). In the example of FIG. 11, the absolute and relative influence of the alternative signal to the navigation parameter estimate is increased via a decrease in the covariance associated with the signal. Alternatively, in some embodiments, a covariance associated with the alternative signal (e.g. visual odometry) can be kept relatively constant, which can increase the relative influence of the alternative signal to the navigation parameter estimate is increased via the increase in the covariance associated with the magnetometer signal.

FURTHER EXAMPLES HAVING A VARIETY OF FEATURES

Implementation examples are described in the following numbered clauses:

1. A method for mitigating navigation sensor errors using a vision system on a marine vessel, the method comprising: identifying, based on image data from a camera, an object in the environment that is predicted to impact reliability of a signal from a navigation sensor of the marine vessel, wherein the object is associated with a location in the environment of the marine vessel, and wherein the camera is configured to be mounted to the marine vessel with an associated field of view of an environment of the marine vessel; determining that the object is in a position to interfere with the navigation sensor based on the location associated with the object; and determining a navigation parameter of the marine vessel with a reduced reliance on signals from the navigation sensor based on the determination that the object is in a position to interfere.

2. The method of clause 1, wherein the camera is a stereoscopic camera.

3. The method of any one of clauses 1 or 2, wherein the navigation parameter is one of a plurality of navigation parameters, the plurality of navigation parameters comprising: a heading of the marine vessel; a speed of the marine vessel; and a course, and a course over ground of the marine vessel of the marine vessel.

4. The method of any one of clauses 1 to 3, wherein the navigation sensor comprises a magnetometer, and wherein the navigation parameter is a heading of the marine vessel.

5. The method of clause 4, further comprising: determining an estimated size of the object; and determining an estimated impact of the object on signals from the magnetometer based on the size of the object and a distance to the object.

6. The method of clause 5, further comprising: determining three-dimensional location information associated with the object in a three-dimensional global coordinate system based the image data, wherein the three-dimensional location information comprises point cloud points; determining an estimated shape of the object, including a portion of the object that is outside of the field of view of the camera, based on the point cloud points; and determining the estimated size of the object based on the estimated shape of the object.

7. The method of clause 6, further comprising: determining an estimated mass of iron included in the object based on the size of the object; determining an estimated location of a centroid of the object based on the estimated shape of the object; and determining the estimated impact based on the estimated mass of iron and the inverse square of a distance between the estimated location of the centroid and a location of the magnetometer.

8. The method of any one of clauses 6 or 7, further comprising: determining whether the estimated impact exceeds a predetermined threshold; and causing reliance on the signals from the navigation sensor to be reduced in response to determining that the estimated impact exceeds the predetermined threshold.

9. The method of any one of clauses 1 to 8, wherein the navigation sensor comprises a satellite navigation receiver, and wherein the navigation parameter is a course over ground of the marine vessel.

10. The method of any one of clauses 1 to 9, further comprising: receiving segmentation information associated with the camera, wherein the segmentation information includes classification information associated with features located in the field of view associated with the camera; and identifying the object based on the segmentation information.

11. The method of any one of clauses 1 to 10, wherein the navigation sensor comprises a magnetometer, and wherein the method further comprises: receiving the image data from the camera; providing the image data to a trained machine learning model, wherein the trained machine learning model was trained to identify objects that include ferromagnetic material that interferes with the magnetometer; and receiving, from the trained machine learning model, output indicative of a likelihood that the object includes ferromagnetic material that interferes with the magnetometer; and determining, based at least in part on the output received from the trained machine learning model, that the object is predicted to impact reliability of the signal from the magnetometer.

12. The method of any one of clauses 1 to 11, further comprising: receiving, from a data structure, information identifying one or more disturbance objects in the environment within a predetermined distance of the marine vessel, wherein the one or more disturbance objects are objects that impact reliability of a signal from at least one type of navigation sensor, the navigation sensor of the marine vessel corresponding to the at least one type, and wherein each of the one or more disturbance objects is associated with a location; determining that the object does not correspond to any of the one or more disturbance objects based on the location associated with the object; and in response to determining that the object does not correspond to any of the one or more disturbance objects, adding the object to the data structure as a disturbance object.

13. The method of any one of clauses 1 to 12, further comprising: adjusting a covariance associated with signals from the navigation sensor based on the determination that the object is in a position to interfere; and determining, using a Kalman filter, the navigation parameter of the marine vessel using the adjusted covariance.

14. The method of any one of clauses 1 to 12, further comprising: adjusting a filter gain associated with signals from the navigation sensor based on the determination that the object is in a position to interfere; and determining, using a complimentary filter, the navigation parameter of the marine vessel using the adjusted filter gain.

15. A method for mitigating navigation sensor errors on a marine vessel, the method comprising: determining a current location of the marine vessel; querying a data structure based on the current location of the marine vessel, wherein the data structure includes information indicative of whether a particular location is associated with a navigation sensor disturbance; receiving a response to the query, wherein the response includes information indicating that a reliability of a signal from a navigation sensor is likely to be impacted based on the current location of the marine vessel; and determining a navigation parameter of the marine vessel with a reduced reliance on signals from the navigation sensor based on the information indicating that a reliability of a signal from the navigation sensor is likely to be impacted based on the current location of the marine vessel.

16. The method of clause 15, wherein the data structure comprises a database that includes a plurality of disturbance objects, each disturbance object is associated with location information.

17. The method of clause 16, wherein each disturbance object is associated information indicative of at least one type of navigation sensor that the disturbance object impacts.

18. The method of any one of clauses 15 to 17, wherein the data structure comprises a map database that includes a magnetic disturbance value associated with each or a plurality of locations.

19. The method of any one of clauses 15 to 18, further comprising: identifying, based on image data from a camera, an object in the environment that is predicted to impact reliability of a signal from the navigation sensor of the marine vessel, wherein the object is associated with a location in the environment of the marine vessel, and wherein the camera is configured to be mounted to the marine vessel with an associated field of view of an environment of the marine vessel; receiving, from the data structure, information identifying one or more disturbance objects in the environment within a predetermined distance of the marine vessel, wherein the one or more disturbance objects are objects that impact reliability of a signal from the navigation sensor, and wherein each of the one or more disturbance objects is associated with a location; and determining whether the object corresponds to one of the disturbance objects based on the location associated with the object.

20. The method of clause 19, further comprising: determining that the object corresponds to one of the disturbance objects based on the location associated with the object; and in response to determining that the object corresponds to one of the disturbance object, reducing reliance on signals from the navigation sensor by an amount based on a disturbance value associated with that disturbance object.

21. The method of any one of clauses 19 or 20, further comprising: determining that the object does not correspond to any of the disturbance objects based on the location associated with the object; determining that the object is a permanent structure; and adding the object to the data structure as a disturbance object.

22. A system comprising: one or more processors configured to: perform a method of any one of clauses 1 to 21.

23. A non-transitory computer-readable medium storing computer-executable code, comprising code for causing a computer to cause a processor to: perform a method of any of one of clauses 1 to 21.

In some embodiments, any suitable computer readable media can be used for storing instructions for performing functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EE-PROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that above-described steps of the processes of FIGS. 3 to 9 can be executed or performed in any suitable order or sequence not limited to the order and sequence shown and described in the figures. Also, some of the above steps of the processes of FIGS. 3 to 9 can be executed or performed substantially simultaneously where appropriate or in parallel to reduce latency and processing times.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for mitigating navigation sensor errors using a vision system on a marine vessel, the system comprising:
   a navigation sensor;
   a camera,
      wherein the camera is configured to be mounted to the marine vessel with an associated field of view of an environment of the marine vessel; and
   one or more hardware processors configured to:
      identify, based on image data from the camera, an object in the environment that is predicted to impact reliability of a signal from the navigation sensor of the marine vessel,
         wherein the object is associated with a location in the environment of the marine vessel;
      determine that the object is in a position to interfere with the navigation sensor based on the location associated with the object; and
      determine a navigation parameter of the marine vessel with a reduced reliance on signals from the navigation sensor based on the determination that the object is in a position to interfere.

2. The system of claim 1, wherein the camera is a stereoscopic camera.

3. The system of claim 1, wherein the navigation parameter is one of a plurality of navigation parameters determined by the one or more hardware processors, the plurality of navigation parameters comprising: a heading of the marine vessel; a speed of the marine vessel; a course of the marine vessel, and a course over ground of the marine vessel.

4. The system of claim 1, wherein the navigation sensor comprises a magnetometer,
   wherein the navigation parameter is a heading of the marine vessel, and
   wherein the one or more hardware processors are further configured to:
      determine the navigation parameter of the marine vessel using a sensor fusion calculation that is provided with signals from multiple navigation sensors including the navigation sensor and a second navigation sensor and outputs a value for the navigation parameter based on a weighted combination of the signals from multiple navigation sensors.

5. The system of claim 1, wherein the navigation sensor comprises a magnetometer,
   wherein the navigation parameter is a heading of the marine vessel, and
   wherein the one or more hardware processors are further configured to:
      determine an estimated size of the object; and
      determine an estimated impact of the object on signals from the magnetometer based on the size of the object and a distance to the object.

6. The system of claim 5, wherein the one or more hardware processors are further configured to:
      determine three-dimensional location information associated with the object in a three-dimensional global coordinate system based the image data,
         wherein the three-dimensional location information comprises point cloud points;
      determine an estimated shape of the object, including a portion of the object that is outside of the field of view of the camera, based on the point cloud points; and
      determine the estimated size of the object based on the estimated shape of the object.

7. The system of claim 6, wherein the one or more hardware processors are further configured to:
      determine an estimated mass of iron included in the object based on the size of the object;
      determine an estimated location of a centroid of the object based on the estimated shape of the object; and
      determine the estimated impact based on the estimated mass of iron and the inverse square of a distance between the estimated location of the centroid and a location of the magnetometer.

8. The system of claim 6, wherein the one or more hardware processors are further configured to:
      determine whether the estimated impact exceeds a predetermined threshold; and
      cause reliance on the signals from the navigation sensor to be reduced in response to determining that the estimated impact exceeds the predetermined threshold.

9. The system of claim 1, wherein the navigation sensor comprises a satellite navigation receiver, and
   wherein the navigation parameter is a course over ground of the marine vessel.

10. The system of claim 1, wherein the one or more hardware processors are further configured to:

receive segmentation information associated with the camera, wherein the segmentation information includes classification information associated with features located in the field of view associated with the camera; and identify the object based on the segmentation information.

11. The system of claim 1, wherein the navigation sensor comprises a magnetometer, and wherein the one or more hardware processors are further configured to:

receive the image data from the camera;

provide the image data to a trained machine learning model, wherein the trained machine learning model was trained to identify objects that include ferromagnetic material that interferes with the magnetometer; and receive, from the trained machine learning model, output indicative of a likelihood that the object includes ferromagnetic material that interferes with the magnetometer; and determine, based at least in part on the output received from the trained machine learning model, that the object is predicted to impact reliability of the signal from the magnetometer.

12. The system of claim 1, wherein the one or more hardware processors are further configured to:

receive, from a data structure, information identifying one or more disturbance objects in the environment within a predetermined distance of the marine vessel, wherein the one or more disturbance objects are objects that impact reliability of a signal from at least one type of navigation sensor, the navigation sensor of the marine vessel corresponding to the at least one type, and wherein each of the one or more disturbance objects is associated with a location;

determine that the object does not correspond to any of the one or more disturbance objects based on the location associated with the object; and in response to determining that the object does not correspond to any of the one or more disturbance objects, add the object to the data structure as a disturbance object.

13. The system of claim 1, wherein the one or more hardware processors are further configured to:

adjust a covariance associated with signals from the navigation sensor based on the determination that the object is in a position to interfere; and determine, using a Kalman filter, the navigation parameter of the marine vessel using the adjusted covariance.

14. The system of claim 1, wherein the one or more hardware processors are further configured to:

adjust a filter gain associated with signals from the navigation sensor based on the determination that the object is in a position to interfere; and determine, using a complimentary filter, the navigation parameter of the marine vessel using the adjusted filter gain.

15. A method for mitigating navigation sensor errors using a vision system on a marine vessel, comprising:

identifying, based on image data from a camera, an object in the environment that is predicted to impact reliability of a signal from a navigation sensor of the marine vessel, wherein the object is associated with a location in the environment of the marine vessel, and wherein the camera is configured to be mounted to the marine vessel with an associated field of view of an environment of the marine vessel;

determining that the object is in a position to interfere with the navigation sensor based on the location associated with the object; and determining a navigation parameter of the marine vessel with a reduced reliance on signals from the navigation sensor based on the determination that the object is in a position to interfere.

16. The method of claim 15, wherein the camera is a stereoscopic camera.

17. The method of claim 15, wherein the navigation parameter is one of a plurality of navigation parameters determined by the one or more hardware processors, the plurality of navigation parameters comprising: a heading of the marine vessel; a speed of the marine vessel; a course of the marine vessel, and a course over ground of the marine vessel.

18. The method of claim 15, wherein the navigation sensor comprises a magnetometer, and wherein the navigation parameter is a heading of the marine vessel.

19. The method of claim 18, further comprising:

determining an estimated size of the object; and determining an estimated impact of the object on signals from the magnetometer based on the size of the object and a distance to the object.

20. The method of claim 19, further comprising:

determining three-dimensional location information associated with the object in a three-dimensional global coordinate system based the image data, wherein the three-dimensional location information comprises point cloud points;

determining an estimated shape of the object, including a portion of the object that is outside of the field of view of the camera, based on the point cloud points; and determining the estimated size of the object based on the estimated shape of the object.

* * * * *